(12) United States Patent
Miyoshi et al.

(10) Patent No.: US 7,390,337 B2
(45) Date of Patent: **\*Jun. 24, 2008**

(54) FUEL GASIFICATION SYSTEM

(75) Inventors: Norihisa Miyoshi, Tokyo (JP); Seiichiro Toyoda, Tokyo (JP); Shugo Hosoda, Tokyo (JP); Nobutaka Kashima, Tokyo (JP); Katsutoshi Naruse, Tokyo (JP); Katsuyuki Aoki, Tokyo (JP); Shinji Sekikawa, Toyko (JP); Shuichi Nagato, Tokyo (JP); Hiroshi Hashimoto, Tokyo (JP)

(73) Assignee: Ebara Corporation, Tokyo (JP)

( \* ) Notice: Subject to any disclaimer, the term of this patent is extended or adjusted under 35 U.S.C. 154(b) by 511 days.

This patent is subject to a terminal disclaimer.

(21) Appl. No.: 11/073,688

(22) Filed: Mar. 8, 2005

(65) Prior Publication Data

US 2005/0144844 A1 Jul. 7, 2005

Related U.S. Application Data

(62) Division of application No. 09/581,593, filed on Aug. 1, 2000, now Pat. No. 6,949,224.

(51) Int. Cl.
*B01J 8/00* (2006.01)
*B01J 8/18* (2006.01)

(52) U.S. Cl. ............... 48/127.9; 422/139; 422/141; 422/142

(58) Field of Classification Search ............ 48/127.9; 422/139, 141, 142
See application file for complete search history.

(56) References Cited

U.S. PATENT DOCUMENTS 2,985,515 A 5/1961 McKinley 3,912,465 A \* 10/1975 Kunii et al. ............ 48/101
4,274,941 A 6/1981 Janssen et al.
4,740,216 A \* 4/1988 Allard ............ 48/76

(Continued)

FOREIGN PATENT DOCUMENTS

EP 0 030 152 6/1981

(Continued)

*Primary Examiner*—Walter D. Griffin
*Assistant Examiner*—Huy-Tram Nguyen
(74) *Attorney, Agent, or Firm*—Wenderoth, Lind & Ponack, L.L.P.

(57) ABSTRACT

The present invention provides a fuel gasification furnace including a gasification chamber (1) for fluidizing a high-temperature fluidizing medium therein to form a gasification chamber fluidized bed having an interface, and for gasifying a fuel in the gasification chamber fluidized bed, a char combustion chamber (2) for fluidizing a high-temperature fluidizing medium therein to form a char combustion chamber fluidized bed having an interface, and for combusting char generated by gasification in the gasification chamber (1) in the char combustion chamber fluidized bed to heat the fluidizing medium, and a first energy recovery device (109) for using gases generated by the gasification chamber (1) as a fuel. The gasification chamber (1) and the char combustion chamber (2) are integrated with each other. The gasification chamber (1) and the char combustion chamber (2) are divided from each other by a first partition wall (15) for preventing gases from flowing therebetween, and which extends vertically upward from the interfaces of the respective fluidized beds. The first partition wall (15) has a first opening (25) provided in a lower portion thereof, and the first opening (25) serves as a communication between the gasification chamber (1) and the char combustion chamber (2), for allowing the fluidizing medium heated in the char combustion chamber (2) to move from the char combustion chamber (2) via the first opening (25) into the gasification chamber (1).

11 Claims, 17 Drawing Sheets

U.S. PATENT DOCUMENTS

| | | |
|---|---|---|
| 5,313,913 A | 5/1994 | Ohshita et al. |
| 5,513,599 A | 5/1996 | Nagato et al. |
| 5,922,090 A | 7/1999 | Fujimura et al. |
| 6,709,636 B1 * | 3/2004 | Oshita et al. ............... 422/146 |
| 6,949,224 B1 * | 9/2005 | Miyoshi et al. ............. 422/139 |

FOREIGN PATENT DOCUMENTS

| | | |
|---|---|---|
| EP | 0 117 634 | 9/1984 |
| EP | 0 312 840 | 4/1989 |
| JP | 51-19379 | 2/1976 |
| JP | 51-64505 | 6/1976 |
| JP | 51-104473 | 9/1976 |
| JP | 52-91563 | 8/1977 |
| JP | 53-30480 | 3/1978 |
| JP | 54-100402 | 8/1979 |
| JP | 57-30793 | 2/1982 |
| JP | 57-32728 | 2/1982 |
| JP | 57-73076 | 5/1982 |
| JP | 57-209994 | 12/1982 |
| JP | 60-1285 | 1/1985 |
| JP | 60-1286 | 1/1985 |
| JP | 60-6786 | 1/1985 |
| JP | 2-147692 | 6/1990 |
| JP | 3-131687 | 6/1991 |
| JP | 5-106807 | 4/1993 |
| JP | 6-317306 | 11/1994 |
| JP | 7-301411 | 11/1995 |
| JP | 7-332614 | 12/1995 |
| JP | 10-89640 | 4/1998 |

* cited by examiner

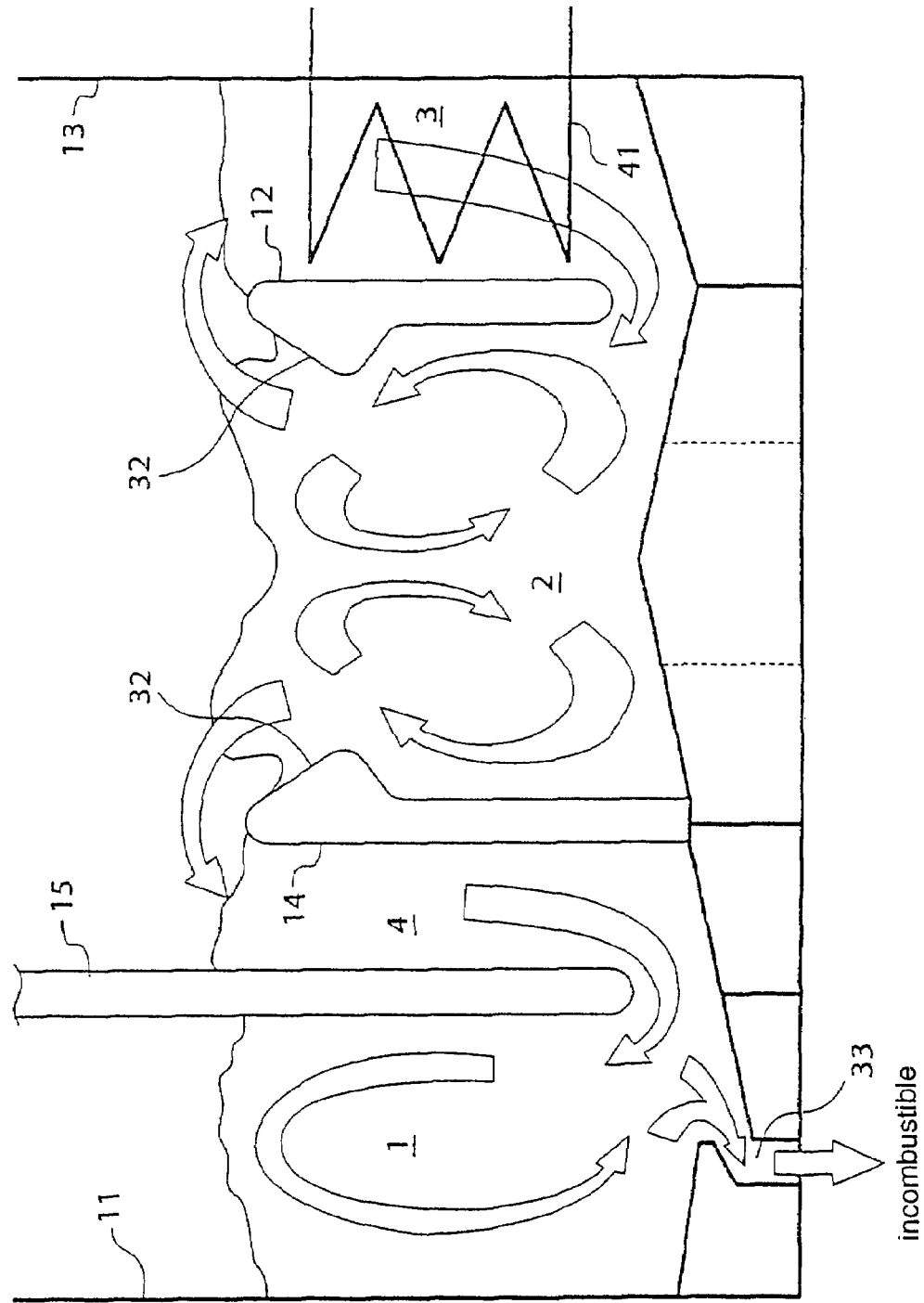

P1>P2

P1<P2

F I G. 17
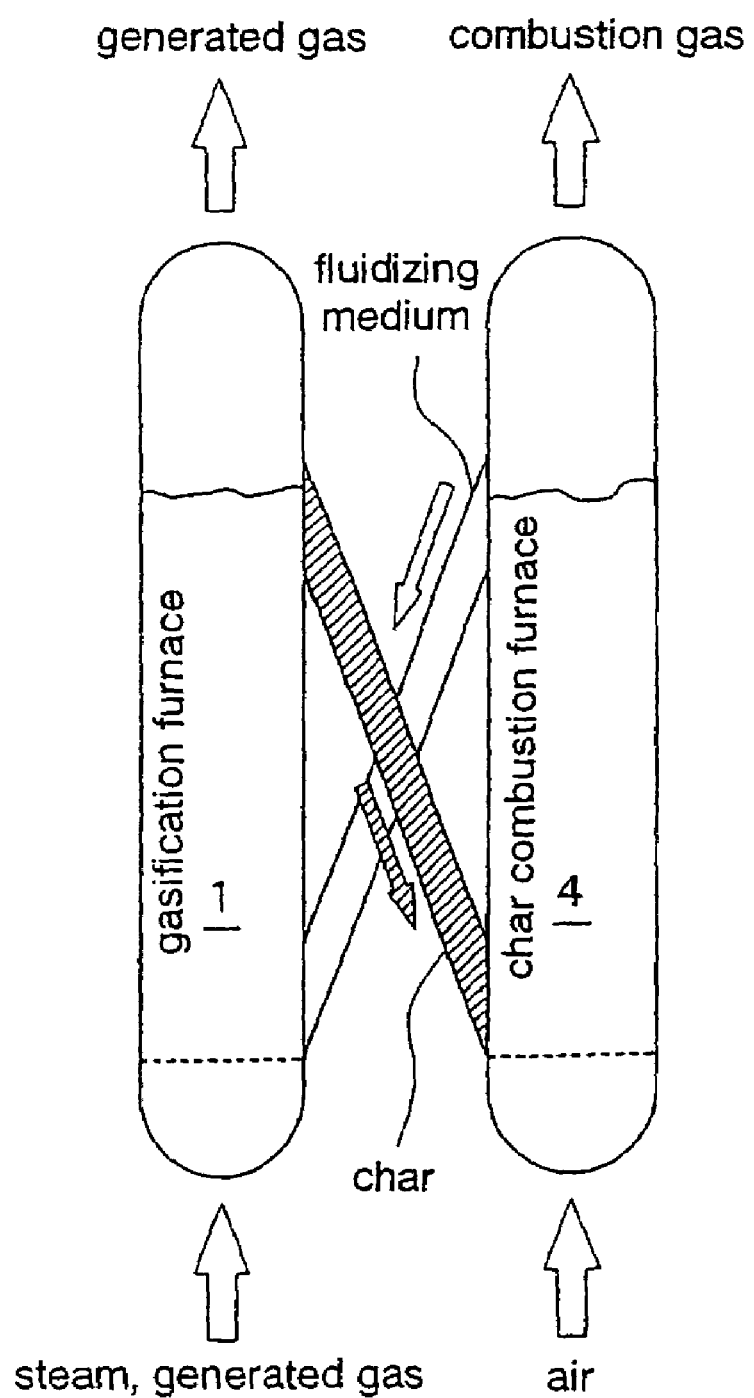

F I G. 18
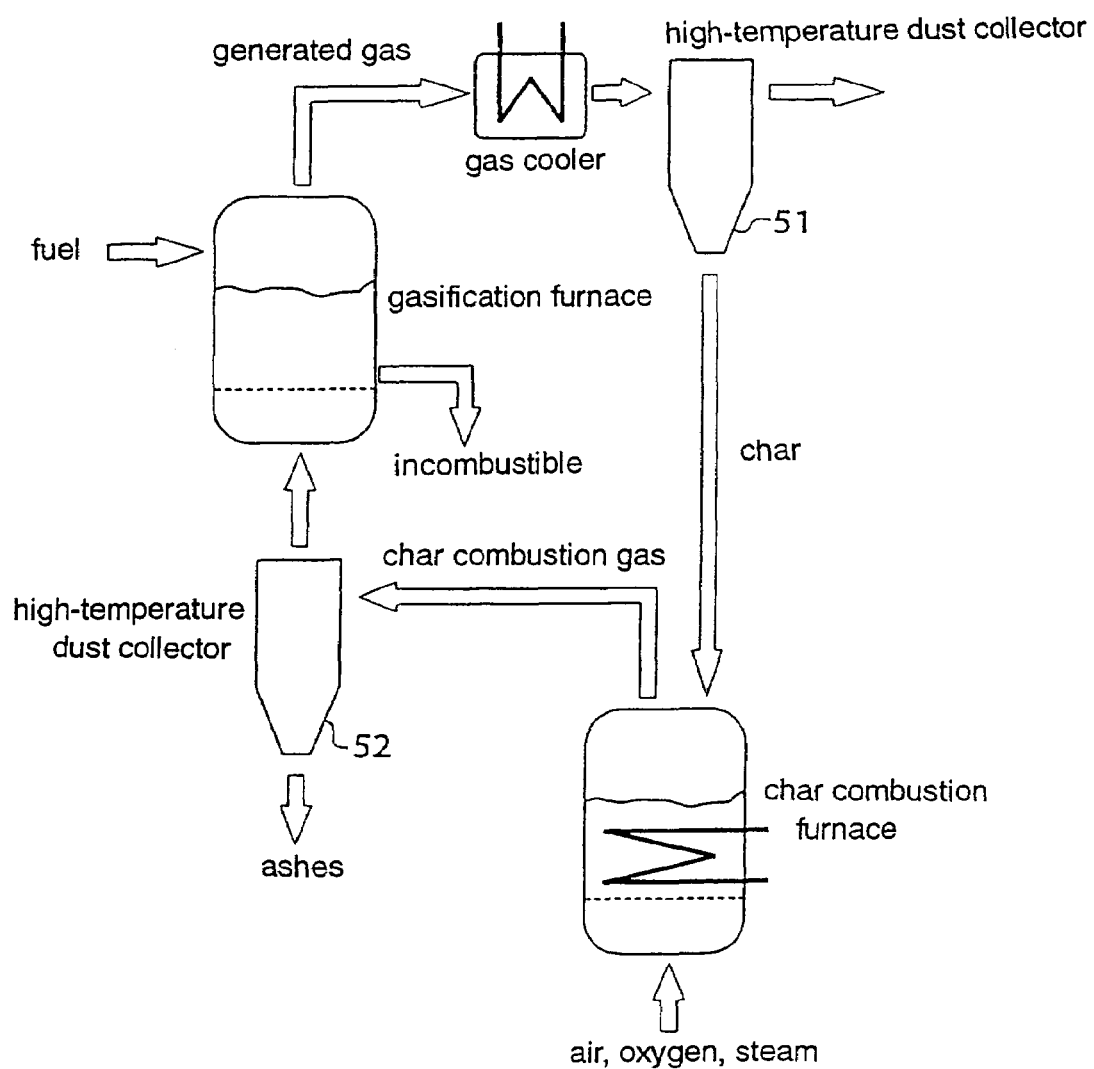

US 7,390,337 B2

FUEL GASIFICATION SYSTEM

This application is a divisional application of U.S. patent application Ser. No. 09/581,593, filed Aug. 1, 2000 now U.S. Pat. No. 6,949,224 now allowed.

TECHNICAL FIELD

The present invention relates to a gasification furnace for gasifying fuels including coal, municipal waste, etc., and a gasification system which employs such a gasification furnace.

BACKGROUND ART

Various efforts are being made at present in various countries with respect to highly efficient power generation systems which employ coal as fuel. For increasing power generation efficiency, it is important to convert the chemical energy of coal into electric energy with high efficiency. However, in recent years how to develop such highly efficient power generation systems has been looked over. The integrated gasification combined cycle (IGCC) technology converts coal into a clean chemical energy by gasification, and then converts the chemical energy directly into electric energy with a fuel cell or utilizes the chemical energy to rotate a gas turbine at a high temperature for generating electric energy with high efficiency. However, since the IGCC technology is oriented toward the complete gasification of the coal, the gasification temperature needs to be increased to a temperature range for melting the ash, resulting in many problems related to the discharge of the molten slag and the durability of the refractory material. Furthermore, because part of the heat energy is consumed for melting the ash, although the generated gases are discharged in such a state that they have a high temperature, the temperature of the generated gases must be lowered for gas purification to a temperature of, for example, about 450° C., causing a very large sensible heat loss. Another problem is that it is necessary to supply oxygen or oxygen-enriched air in order to achieve a high temperature stably. For these reasons, the net energy conversion efficiency is not increased, and no technology is available for generating electric energy with high efficiency using the generated gases. At the present time, it has been found that the net power generation efficiency is not high at all.

In the integrated gasification combined cycle (IGCC), there is an upper limit on the efficiency of the technology for finally converting the chemical energy into electric energy, resulting in a bottleneck in attempts to increase the overall efficiency. Therefore, highly efficient power generation technology that has drawn much attention in recent years simply generates as large an amount of gases as possible while keeping the temperature at the inlet of a gas turbine to an upper limit for increasing the ratio of generated power output from the gas turbine. Typical examples of the highly efficient power generation technology include a topping cycle power generation system and a power generation system using an improved pressurized fluidized-bed furnace.

In the power generation system using an improved pressurized fluidized-bed furnace, coal is first gasified by a pressurized gasification furnace, and generated unburned carbon (so-called char) is combusted by a pressurized char combustor. After combustion gases from the char combustor and generated gases from the gasification furnace are cleaned, they are mixed and combusted by a topping combustor, which produces high-temperature gases to drive a gas turbine. It is important in this power generation system how to increase the amount of gases flowing into the gas turbine. The greatest one of the conditions which imposes limitations on the increase in the flowrate of gases to the gas turbine is the cleaning of the generated gases.

For cleaning the generated gases, it is necessary to cool the generated gases usually to about 450° C. in view of an optimum temperature for a desulfurizing reaction in a reducing atmosphere. On the other hand, the gas temperature at the inlet of the gas turbine should be as high as possible because the efficiency of the gas turbine is enhanced as the gas temperature is higher. At present, it is an ordinal way to increase the gas temperature at the inlet of the gas turbine to 1200° C. or slightly lower due to limitations imposed by heat resistance and corrosion resistance of the materials for the gas turbine. Therefore, the generated gases are required to have a calorific value high enough to increase the gas temperature from 450° C. for the gas cleaning to 1200° C. at the inlet of the gas turbine.

Consequently, for the development of a power generation system using an improved pressurized fluidized-bed furnace, efforts should be made to obtain generated gases in as small an amount as possible and having as high a calorific value as possible. The reasons for those efforts are as follows: If the amount of generated gases to be cleaned at 450° C. is reduced, the loss of sensible heat due to the cooling is reduced, and a required minimum calorific value of the generated gases may be lowered. If the calorific value of the generated gases is higher than the calorific value needed to increase the gas temperature to the required gas temperature at the inlet of the gas turbine, then the ratio of combustion air can be increased to increase the amount of gases flowing into the gas turbine for a further increase in the efficiency of power generation.

In recent years, efforts to develop highly efficient waste combustion power generation technology are being carried out in order to utilize municipal waste, etc. as a fuel. However, one problem of the highly efficient waste combustion power generation technology is that since a high concentration of chlorine may be contained in the waste, the steam temperature for heat recovery cannot be increased beyond 400° C. due to possible corrosion of heat transfer pipes. Therefore, there has been a demand for the development of a technology that can overcome the above difficulty.

One typical conventional gasification furnace which employs coal or the like as a fuel is a twin tower circulation type gasification furnace as shown in FIG. 17 of the accompanying drawings. The two-bed pyrolysis reactor system comprises two furnaces (towers), i.e., a gasification furnace and a char combustion furnace. A fluidizing medium and char are circulated between the gasification furnace and the char combustion furnace, and a quantity of heat required for gasification is supplied to the gasification furnace as the sensible heat of the fluidizing medium which has been heated by the combustion heat of the char in the char combustion furnace. Since gases generated in the gasification furnace do not need to be combusted, the calorific value of the generated gases can be maintained at a high level. However, the two-bed pyrolysis reactor system has not actually been commercialized as a large-scale plant because of problems relating to the handling of high-temperature particles, such as obtaining a sufficient amount of particle circulation between the gasification furnace and the char combustion furnace, controlling of the circulating amount of particles, and stable operation, and problems relating to operation, such as a failure in temperature control of the char combustion furnace independently of other operations.

There has recently been proposed a system in which entire combustion gases discharged from a char combustion furnace are led to a gasification furnace to make up for a shortage of heat for gasification which is not fully supplied by the sensible heat of circulating particles, as shown in FIG. 18 of the accompanying drawings. However, inasmuch as the proposed system delivers the entire combustion gases discharged from the char combustion furnace to the gasification furnace, it goes against the principle of the power generation system using an improved pressurized fluidized-bed furnace that it should be obtained generated gases in as small an amount as possible and having as high a calorific value as possible. That is, if the amount of char combustion gases becomes larger than an amount required for gasification or fluidization in the gasification furnace, then since the generated gases are diluted by the excessive char combustion gases, the calorific value is lowered, and the mixed excessive char combustion gases are also cooled to 450° C. for gas cleaning in a reducing atmosphere, with the result that the quantity of heat necessary to raise the gas temperature to a proper temperature at the gas turbine inlet is increased. Conversely, if the amount of char combustion gases becomes smaller, then the fluidization in the gasification furnace becomes insufficient or the temperature of the gasification furnace is lowered, resulting in a need for supplying air to the gasification furnace. Therefore, in order for this system to be realized, it is necessary to select coal among the limited coal range suitable for the system. If the selected coal differs even slightly from the limited coal range, then the excessive char combustion gases need to be cooled to 450° C., or the calorific value of the generated gases is lowered because of the introduction of air into the gasification furnace, with the result that the efficiency of the overall system will be lowered.

In this system, the temperature of the char combustion furnace is controlled by changing the bed height to change the heat transfer area in the bed. When the system undertakes a low load, as the combustion gases are cooled by the heat transfer pipes exposed over the bed, the temperature of the gasification furnace and the fluidizing gas velocity changes, affecting the gasifying reaction rate to make it difficult to operate the system stably.

In view of the above drawbacks, the inventors of the present invention have devised an integrated gasification furnace comprising a single fluidized-bed furnace which has a gasification chamber, a char combustion chamber, and a low-temperature combustion chamber divided thereby by partitions. The char combustion chamber, the gasification chamber, and the low-temperature combustion chamber are disposed adjacent to each other. The inventors have invented the integrated gasification furnace in order to overcome the drawbacks of the two-bed pyrolysis reactor system described above. The integrated gasification furnace allows a large amount of fluidizing medium to circulate between the char combustion chamber and the gasification chamber. Consequently, heat for gasification can sufficiently be supplied only by the sensible heat of the fluidizing medium. The integrated gasification furnace is possibly able to achieve, most easily, the principle of the power generation system using an improved pressurized fluidized-bed furnace so that generated gases should be obtained in as small an amount as possible and having as high a calorific value as possible.

Nevertheless, the integrated gasification furnace is problematic in that since no complete seal is provided between char combustion gases and generated gases, the combustion gases and the generated gases may be mixed with each other, degrading the properties of the generated gases, if the pressure balance between the gasification chamber and the char combustion chamber is not kept well.

In the field of waste combustion power generation systems, it has been proposed to pyrolyze the wastes and volatilize a chlorine component together with volatile components, and superheat the steam with the combustion heat of remaining char which has a greatly reduced chlorine content, for highly efficient power generation. However, since a small amount of char is produced by the pyrolysis of municipal wastes, it is highly likely not to obtain a char combustion heat required to superheat the steam. The fluidizing medium as a heat medium and the char flow from the gasification furnace into the char combustion furnace, and the same amount of fluidizing medium needs to return from the char combustion furnace to the gasification furnace for achieving a mass balance. According to an available conventional method, the fluidizing medium has to be mechanically delivered by a conveyor or the like, resulting in problems such as the difficulty in handing high-temperature particles and a large sensible heat loss.

SUMMARY OF THE INVENTION

The present invention has been made in view of the above conventional problems. It is an object of the present invention to provide a fuel gasification furnace which does not need the special control of a pressure balance between a gasification furnace and a char combustion furnace, or a mechanical means for handling a fluidizing medium, which can stably obtain generated gases of high quality, and is capable of highly efficient power recovery. Another object of the present invention is to provide an integrated gasification furnace which is capable of reading reduced corrosion on a steam superheater (pipes), etc. and is capable of highly efficient power generation even when a combustible waste material containing chlorine is used as a fuel.

To achieve the above objects, a fuel gasification system according to the present invention comprises, as shown in FIGS. 1 and 13, a gasification chamber 1 for fluidizing a high-temperature fluidizing medium therein to form a gasification chamber fluidized bed having an interface, and gasifying a fuel in the gasification chamber fluidized bed. A char combustion chamber 2 is provided for fluidizing a high-temperature fluidizing medium therein to form a char combustion chamber fluidized bed having an interface, and combusting char generated by gasification in the gasification chamber 1 in the char combustion chamber fluidized bed to heat the fluidizing medium. A first energy recovery device 109 uses gases generated by the gasification chamber 1 as a fuel, and the gasification chamber 1 and the char combustion chamber 2 are integrated with each other. The gasification chamber 1 and the char combustion chamber 2 are divided from each other by a first partition wall 15 for preventing gases from flowing therebetween vertically upwardly from the interfaces of the respective fluidized beds. The first partition wall 15 has a first opening 25 provided in a lower portion thereof and serves the first opening as a communication between the gasification chamber 1 and the char combustion chamber 2, for allowing the fluidizing medium heated in the char combustion chamber 2 to move from the char combustion chamber 2 via the first opening into the gasification chamber.

With the above arrangement, since the gasification chamber and the char combustion chamber are integrated with each other, the fluidizing medium can be handled with ease between the gasification chamber and the char combustion chamber. Since the gasification chamber and the char combustion chamber are divided from each other by the first partition wall for preventing gases from flowing therebetween upwardly of the interfaces of the respective fluidized beds, the gases generated in the gasification chamber and the combustion gases in the char combustion chamber are not almost mixed with each other. Since the energy recovery device, which is a power recovery device such as a gas turbine, is provided, the power or energy can be recovered in such a way as to drive a fluid machine such as an air compressor or a generator.

The fluidized bed in the fuel gasification system according to the invention comprises a dense bed, positioned in a vertically lower region, which contains a high concentration of fluidizing medium, and a splash zone, positioned vertically above the dense bed, which contains both the fluidizing medium and a large amount of gases. Above the fluidized bed (i.e., above the splash zone) there is positioned a freeboard which contains almost no fluidizing medium, but is primarily made up of gases. The interface according to the present invention refers to a splash zone having a certain thickness. However, the interface may be understood as a hypothetical plane positioned intermediate between an upper surface of the splash zone and a lower surface of the splash zone (upper surface of the dense bed). Preferably, the chambers are divided from each other by the partition wall such that no gases flow therebetween upwardly of the dense bed.

In the fuel gasification system of the present invention, the gasification chamber 1 and the char combustion chamber 2 are divided (separated) from each other by a second partition wall 11 for preventing gases from flowing therebetween vertically upward from the interfaces of the respective fluidized beds. The second partition wall 11 has a second opening 21 provided in a lower portion thereof and serves the second opening as a communication between the gasification chamber 1 and the char combustion chamber 2, for allowing the fluidizing medium heated to move from the gasification chamber 1 via the second opening 21 into the char combustion chamber 2.

With the above arrangement, since the fluidizing medium moves from the gasification chamber 1 via the second opening 21 into the char combustion chamber 2, when char is generated in the gasification chamber 1, the char moves, together with the fluidizing medium, into the char combustion chamber 2, and a mass balance of the fluidizing medium between the gasification chamber 1 and the char combustion chamber 2 is maintained.

The above fuel gasification system further comprises a heat recovery chamber 3 integrated with the gasification chamber 1 and the char combustion chamber 2. The gasification chamber 1 and the heat recovery chamber 2 are divided from each other or are not in contact with each other so that gases will not flow directly therebetween. With this arrangement, heat can be recovered without causing the gases generated in the gasification chamber and the combustion gases in the heat recovery chamber to be mixed with each other. The heat recovery chamber is provided, and even when the amount of char generated in the gasification chamber and the amount of char required to heat the fluidizing medium in the char combustion chamber is out of balance, the difference between the amounts can be adjusted by increasing or reducing the amount of heat recovered in the heat recovery chamber.

The fuel combustion chamber described above may comprise a boiler 111 for being supplied with the gases used as the fuel in the first energy recovery device 109 and combustion gases from the char combustion chamber 2. Typically, the first energy recovery device is a gas turbine unit 109 or its gas turbine 106, and the gases used as the fuel are waste gases combusted in a combustor 105 of the gas turbine unit and from which energy is recovered by the gas turbine 106. Since the waste gases contain a considerable amount of heat energy, the heat energy is recovered by the boiler 111.

In the above system, an oxygen-free gas should preferably be used as the fluidizing gas in the gasification chamber 1. The oxygen-free gas refers to a gas which contains a small amount of oxygen, and whose oxygen concentration is not large enough to substantially combust the gases generated in the gasification furnace. Because the oxygen-free gas is used, the generated gases are not substantially combusted, and have a high calorific value.

As shown in FIG. 14, the gasification chamber and the char combustion chamber are pressurized to a pressure higher than an atmospheric pressure. The fuel gasification system further comprises a second energy recovery device 141 driven by combustion gases from the char combustion chamber 2, and a boiler 111 for being supplied with the waste gases used as the fuel in the first energy recovery device 109 and combustion gases from the second energy recovery device 141.

With the above arrangement, since the combustion gases from the char combustion chamber have a pressure energy in addition to a temperature energy, the second energy recovery device, typically a power recovery turbine having the same structure as the gas turbine in the gas turbine unit, can recover power from the combustion gases. The gases generated in the gasification chamber can be led directly to the combustor 105 of the gas turbine unit, without passing through a gas compressor, and the combustion gases from the combustor 105 are introduced into the gas turbine 106 of the gas turbine unit for generating power. Therefore, the gas compressor combined with the gas turbine may be dispensed with. However, if there is a difference between the pressure required for the gas turbine and the pressure of the generated gases, then a gas compressor may be provided for generating a pressure to compensate for the pressure difference.

To achieve the above object, a fuel gasification system according to the present invention comprises, as shown in FIGS. 1 and 11, a gasification chamber 1 for fluidizing a high-temperature fluidizing medium therein to form a gasification chamber fluidized bed having an interface, and gasifying a fuel in the gasification chamber fluidized bed. A char combustion chamber 2 is provided for fluidizing a high-temperature fluidizing medium therein to form a char combustion chamber fluidized bed having an interface, and combusting char generated by gasification in the gasification chamber 1 in the char combustion chamber fluidized bed to heat the fluidizing medium and generate combustion gases. A stabilizing combustion chamber 53 is provided for combusting gases generated in the gasification chamber 1 to heat the combustion gases generated in the char combustion chamber 2, and an energy recovery device 55 recovers energy from the combustion gases heated in the stabilizing combustion chamber 53. The gasification chamber 1 and the char combustion chamber 2 are integrated with each other and pressurized to a pressure higher than an atmospheric pressure. The gasification chamber 1 and the char combustion chamber 2 are divided from each other by a first partition wall 15 for preventing gases from flowing therebetween vertically upward of the interfaces of the respective fluidized beds. The first partition wall 15 has a first opening 25 provided in a lower portion thereof, and the first opening 25 serves as a communication between the gasification chamber 1 and the char combustion chamber 2, for allowing the fluidizing medium heated in the char combustion chamber 2 to move from the char combustion chamber 2 via the first opening 25 into the gasification chamber 1.

With the above arrangement, since the gasification chamber 1 and the char combustion chamber 2 are integrated with each other and pressurized to a pressure higher than an atmospheric pressure, the partial pressure of oxygen in the char combustion chamber can be increased to maintain a good combustion state, and energy can be recovered from the combustion gases from the char combustion chamber by the energy recovery device, which comprises a power recovery turbine, for example. When the generated gases from the gasification chamber are combusted in the stabilizing combustion chamber, the combustion gases from the char combustion chamber can be heated to a high temperature of 1200° C., for example. Therefore, power can be recovered highly efficiently by the power recovery turbine.

In the fuel gasification system described above, the gasification chamber 1 and the char combustion chamber 2 are divided from each other by a second partition wall 11 for preventing gases from flowing therebetween vertically upwardly from the interfaces of the respective fluidized beds. The second partition wall 11 has a second opening 21 provided in a lower portion thereof and the second opening serves as a communication between the gasification chamber 1 and the char combustion chamber 2, for allowing the fluidizing medium heated to move from the gasification chamber 1 via the second opening 21 into the char combustion chamber 2.

The fuel gasification system described above further comprises a heat recovery chamber 3 integrated with the gasification chamber 1 and the char combustion chamber 2, and the gasification chamber 1 and the heat recovery chamber 3 are divided from each other or are not in contact with each other so that gases will not flow directly therebetween.

The fuel gasification system described above further comprises a boiler 58 for being supplied with the gases from which the energy is recovered by the energy recovery device 58. Even after the energy is recovered by the energy recovery device 58, heat can be recovered from waste gases which contain heat energy by the boiler.

As shown in FIGS. 15 and 16, in the fuel gasification system described above, the boiler 58 may combust a fuel other than the gases supplied thereto. Even when the amount of heat required for the boiler and the amount of heat supplied from the char combustion chamber are brought out of balance, the difference can be compensated for by the other fuel. Therefore, an existing boiler 131 may be used as the boiler.

To achieve the above object, a method of repowering an existing boiler according to the present invention comprises, as shown in FIG. 15 or 16, the steps of providing an existing boiler 131; and providing a fuel gasification system as described above for supplying combustion gases to the existing boiler 131.

According to the above method, the fuel gasification system is connected to the existing boiler for supplying combustion gases to the existing boiler. Consequently, a boiler which has low efficiency and discharges a large amount of carbon dioxide gas, such as an existing boiler which uses pulverized coal as a fuel, can be modified, i.e., repowered, into a highly efficient energy generating system.

BRIEF DESCRIPTION OF THE DRAWINGS

FIG. 2 is a schematic diagram showing a modification of the integrated gasification furnace shown in FIG. 1, with a slanted furnace bottom and a partition wall having a bulge;

FIG. 17 is a schematic diagram of a conventional two-bed pyrolysis reactor system; and FIG. 18 is a schematic diagram of a combined cycle power generation system which employs a conventional fluidized-bed furnace.

DETAILED DESCRIPTION OF THE INVENTION

Embodiments of the present invention will be described below with reference to FIGS. 1 through 16.

Figure 1:
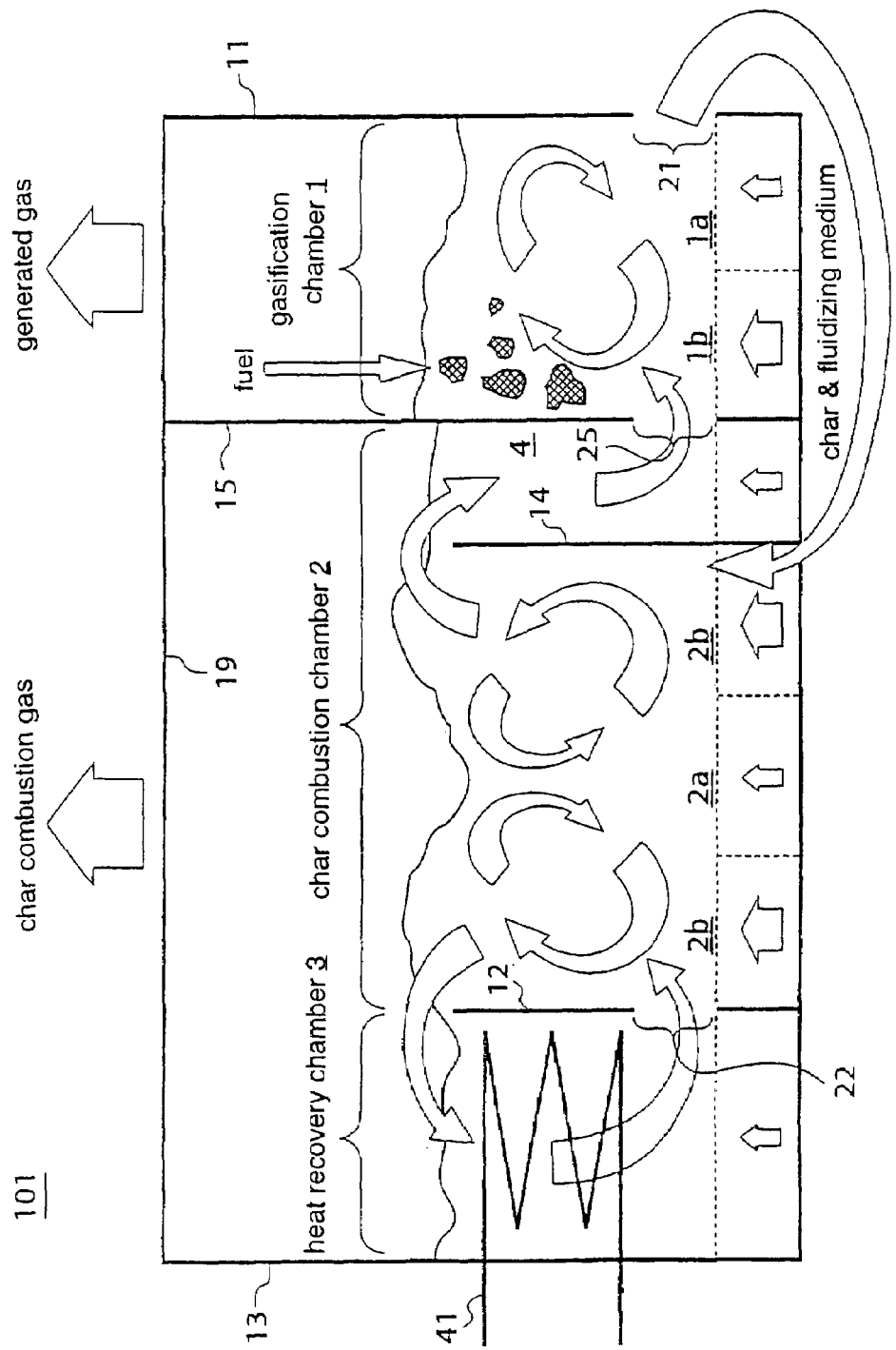
FIG. 1 is a schematic diagram showing the basic concept of an integrated gasification furnace according to the present invention.

FIG. 1 schematically shows the basic structure of a gasification furnace according to the present invention. An integrated gasification furnace 101 according to the embodiment shown in FIG. 1 has a gasification chamber 1, a char combustion chamber 2, and a heat recovery chamber 3 for performing three respective functions of pyrolysis (i.e., gasification), char combustion, and heat recovery, the chambers being housed in a furnace which is cylindrical or rectangular, for example, in shape. The gasification chamber 1, the char combustion chamber 2, and the heat recovery chamber 3 are divided by partition walls 11, 12, 13, 14, 15 to form fluidized beds, each comprising a dense bed containing a fluidizing medium, in respective bottoms. Gas diffusers for blowing fluidizing gases into the fluidizing medium are disposed on the furnace bottom of the chambers 1, 2, 3 for causing the fluidizing medium to be fluidized in the fluidized beds in the chambers 1, 2, 3 (i.e., the gasification chamber fluidized bed, the char combustion chamber fluidized bed, and the heat recovery chamber fluidized bed). Each of the gas diffusers comprises a porous plate, for example, placed on the furnace bottom. The gas diffuser is divided into a plurality of compartments. In order to change the space velocity at various parts in each of the chambers, the speed of the fluidizing gases discharged from the compartments of the gas diffusers through the porous plates is changed. Since the gas velocity differs relatively from part to part in the chambers, the fluidizing medium in the chambers flows in different conditions in the parts of the chambers, thus developing internal revolving flow patterns. In FIG. 1, the sizes of blank arrows in the gas diffusers represent the velocity of the discharged fluidizing gases. For example, thick arrows in areas indicated by 2b represent a higher velocity of the discharged fluidizing gases than a thin arrow in the area indicated by 2a.

The gasification chamber 1 and the char combustion chamber 2 are divided from each other by the partition wall 11, the char combustion chamber 2 and the heat recovery chamber 3 are divided from each other by the partition wall 12, and the gasification chamber 1 and the heat recovery chamber 3 are divided from each other by the partition wall 13. These chambers are not installed as separate furnaces, but installed as a single furnace. In the gasification furnace 101, the partition wall 11 serves as a second partition wall according to the present invention. A settling char combustion chamber 4 for settling the fluidizing medium therein is disposed near a portion of the char combustion chamber 2 which is in contact with the gasification chamber 1. Thus, the char combustion chamber 2 is separated into the settling char combustion chamber 4 and another portion of the char combustion chamber 2 (main char combustion chamber). The settling char combustion chamber 4 is divided from the char combustion chamber 2 (main char combustion chamber) by the partition wall 14. The settling char combustion chamber 4 and the gasification chamber 1 are divided from each other by the partition wall 15 which serves as a first partition wall according to the present invention.

A fluidized bed and an interface will be described below. The fluidized bed comprises a dense bed, positioned in a vertically lower region, which contains a high concentration of fluidizing medium (e.g., silica sand) that is held in a fluidizing state by the fluidizing gas, and a splash zone, positioned vertically above the dense bed, which contains both the fluidizing medium and a large amount of gases, with the fluidizing medium splashing violently. Above the fluidized bed (i.e., above the splash zone), there is positioned a freeboard which contains almost no fluidizing medium, but is primarily made up of gases. The interface according to the present invention refers to a splash zone having a certain thickness. Otherwise, the interface may be understood as a hypothetical plane positioned intermediate between an upper surface of the splash zone and a lower surface of the splash zone (upper surface of the dense bed).

Furthermore, with respect to a statement "chambers are divided from each other by a partition wall so as not to allow gases to flow vertically upward from an interface of a fluidized bed", it is preferable that no gases flow above the upper surface of the dense bed below the interface.

The partition wall 11 between the gasification chamber 1 and the char combustion chamber 2 extends substantially fully from a ceiling 19 of the furnace to the furnace bottom (the porous plates of the gas diffusers). However, the partition wall 11 has a lower end that is not in contact with the furnace bottom, and has a second opening 21 near the furnace bottom. However, the opening 21 has an upper end which does not extend upwardly from either one of the gasification chamber fluidized bed interface and the char combustion chamber fluidized bed interface. Preferably, the upper end of the opening 21 does not extend upwardly from either one of the upper surface of the dense bed of the gasification chamber fluidized bed and the upper surface of the dense bed of the char combustion chamber fluidized bed. That is to say, the opening 21 should preferably be arranged so as to be submerged in the dense bed at all times. Thus, the gasification chamber 1 and the char combustion chamber 2 are divided from each other by the partition wall such that no gases flow therebetween at least in the freeboard, or upwardly from the interface, or more preferably upwardly from the upper surface of the dense bed.

The partition wall 12 between the char combustion chamber 2 and the heat recovery chamber 3 has an upper end located near the interface (i.e., above the upper surface of the dense bed), but positioned downwardly from the upper surface of the splash zone. The partition wall 12 has a lower end extending toward the vicinity of the furnace bottom, but not being in contact with the furnace bottom as is the case with the partition wall 11. The partition wall 12 has an opening 22 near the furnace bottom, which does not extend above the upper surface of the dense bed.

The partition wall 13 between the gasification chamber 1 and the heat recovery chamber 3 extends fully from the furnace bottom to the furnace ceiling. The partition wall 14 which divides the char combustion chamber 2 to provide the settling char combustion chamber 4 has an upper end located near the interface of the fluidized bed and a lower end in contact with the furnace bottom. The relationship between the upper end of the partition wall 14 and the fluidized bed is the same as the relationship between the partition wall 12 and the fluidized bed. The partition wall 15 which divides the settling char combustion chamber 4 and the gasification chamber 1 from each other is the same as the partition wall 11. The partition wall 15 extends fully from the furnace ceiling to the furnace bottom. However, the partition wall 15 has a lower end that is not in contact with the furnace bottom, and has a first opening 25 near the furnace bottom. The opening 25 has an upper end which is positioned below the upper surface of the dense bed. Therefore, the relationship between the first opening 25 and the fluidized bed is the same as the relationship between the second opening 21 and the fluidized bed.

A fuel including coal, waste, etc. charged into the gasification chamber is heated by the fluidizing medium, and pyrolyzed and gasified. Typically, the fuel is not combusted, but carbonized, in the gasification chamber 1. Remaining carbonized char and the fluidizing medium flow into the char combustion chamber 2 through the opening 21 in the lower portion of the partition wall 11. The char thus introduced from the gasification furnace 1 is combusted in the char combustion chamber 2 to heat the fluidizing medium. The fluidizing medium heated by the combustion heat of the char in the char combustion chamber 2 flows beyond the upper end of the partition wall 12 into the heat recovery chamber 3. In the heat recovery chamber 3, the heat of the fluidizing medium is removed by a submerged heat transfer pipe 41 disposed below the interface in the heat recovery chamber 3, so that the fluidizing medium is then cooled. The fluidizing medium then flows through the lower opening 22 in the partition wall 12 into the char combustion chamber 2.

Volatile components of the combustibles charged into the gasification chamber 1 are instantaneously gasified, and then solid carbon (char) is gasified relatively slowly. Therefore, the retention time of the char in the gasification chamber 1, i.e., from the time when the char is charged into the gasification chamber to the time when the char flows into the combustion chamber 2, can be an important factor for determining the gasification rate of the fuel (carbon conversion efficiency).

When silica sand is used as the fluidizing medium, since the specific gravity of char is smaller than the specific gravity of the fluidizing medium, the char is accumulated mainly in an upper portion of the bed. If the furnace is of such a structure that the fluidizing medium flows into the gasification chamber and flows from the gasification chamber into the char combustion chamber through the lower opening in the partition wall, then the fluidizing medium that is present mainly in a lower portion of the bed can flow more easily from the gasification chamber into the char combustion chamber than the char present mainly in the upper portion of the bed. Conversely, the char can flow less easily from the gasification chamber into the char combustion chamber. Therefore, it is possible to keep the average retention time of the char in the gasification chamber longer than if a completely mixed bed were developed in the gasification chamber.

The fluidizing medium flowing from the settling char combustion chamber 4 into the gasification chamber 1 is not mixed well with the bed in the gasification chamber 1, but flows mainly through a lower portion of the gasification chamber 1 into the char combustion chamber 2. Even in this case, the fluidizing gas supplied from the gasification chamber bottom and the fluidizing medium perform a heat exchange to transfer heat from the fluidizing gas to the char, so that the heat for gasifying the char can be supplied indirectly from the sensible heat of the fluidizing medium.

Furthermore, it is possible to change the mixed condition of the fluidizing medium and the char in the gasification chamber by adjusting the flowrate of the fluidizing gas in the gasification chamber to control the state of the revolving flows in the gasification chamber, for thereby controlling the average retention time of the char in the gasification chamber.

With the furnace structure according to the present invention, the height of the fluidized bed in the gasification chamber can freely be changed by controlling the pressure difference between the gasification chamber and the char combustion chamber. It is possible to control the average holding time of the char in the gasification chamber according to this method.

The heat recovery chamber 3 is not indispensable for the fuel gasification system according to the present invention. Specifically, if the amount of char, composed mainly of carbon, remaining after the volatile components are gasified in the gasification chamber 1 and the amount of char required to heat the fluidizing medium in the char combustion chamber 2 are nearly equal to each other, then the heat recovery chamber 3 which deprives the fluidizing medium of heat is not necessary. If the difference between the above amounts of char is small, then the gasifying temperature in the gasification chamber 1 becomes higher, resulting in an increase in the amount of a CO gas generated in the gasification chamber 1, so that a carbon balance will be kept in the gasification chamber 1.

In the case that the heat recovery chamber 3 shown in FIG. 1 is employed, the integrated gasification furnace is capable of handling a wide variety of fuels ranging from coal which produces a large amount of char to municipal waste which produces a little amount of char. Therefore, irrespective of whatever fuel may be used, the combustion temperature in the char combustion chamber 2 can appropriately be adjusted to keep the temperature of the fluidizing medium adequate by controlling the amount of heat recovered in the heat recovery chamber 3.

The fluidizing medium which has been heated in the char combustion chamber 2 flows beyond the upper end of the fourth partition wall 14 into the settling char combustion chamber 4, and then flows through the opening 25 in the lower portion of the partition wall 15 into the gasification chamber 1.

The flowing state and movement of the fluidizing medium between the chambers will be described below.

A region in the gasification chamber 1 which is near and in contact with the partition wall 15 between the gasification chamber 1 and the settling char combustion chamber 4 serves as a strongly fluidized region 1b where a fluidized state is maintained more vigorously than the fluidized state in the settling char combustion chamber 4. The velocity of the fluidizing gases may be varied from place to place in order to promote the mixing and diffusion of the charged fuel and the fluidizing medium. For example, as shown in FIG. 1, a weakly fluidized region 1a may be produced in addition to the strongly fluidized region 1b for forming revolving flows.

The char combustion chamber 2 has a central weakly fluidized region 2a and a peripheral strongly fluidized region 2b therein, causing the fluidizing medium and the char to form internal revolving flows. It is preferable that the fluidizing velocity of the gas in the strongly fluidized regions in the gasification chamber 1 and the char combustion chamber 2 be 5 Umf or higher, and the fluidizing velocity of the gas in the weakly fluidized regions therein be 5 Umf or lower. However, the fluidizing velocities of the gas may exceed these ranges if a relative clear difference is provided between the fluidizing velocity in the weakly fluidized region and the fluidizing velocity in the strongly fluidized region. The strongly fluidized region 2b may be arranged in regions in the char combustion chamber 2 which contact the heat recovery chamber 3 and the settling char combustion chamber 4. If necessary, the furnace bottom may have such a slope that the furnace bottom goes down from the weakly fluidized region toward the strongly fluidized region (FIG. 2). Here, "Umf" represents the minimum fluidizing velocity (the gas velocity at which fluidization begins) of the fluidized medium. Therefore, 5 Umf represents a velocity which is five times the minimum fluidizing velocity of the fluidized medium.

As described above, the fluidized state in the char combustion chamber 2 near the partition wall 12 between the char combustion chamber 2 and the heat recovery chamber 3 is relatively stronger than the fluidized state in the heat recovery chamber 3. Therefore, the fluidizing medium flows from the char combustion chamber 2 into the heat recovery chamber 3 beyond the upper end of the partition wall 12 which is positioned near the interface of the fluidized bed. The fluidizing medium that has flowed into the heat recovery chamber 3 moves downwardly (toward the furnace bottom) because of the relatively weakly fluidized state, i.e., the highly dense state, in the heat recovery chamber 3, and then moves from the heat recovery chamber 3 through the opening 22 in the lower end of the partition wall 12 near the furnace bottom and into the char combustion chamber 2.

Similarly, the fluidized state in the major part of the char combustion chamber 2 near the partition wall 14 between the major part of the char combustion chamber 2 and the settling char combustion chamber 4 is relatively stronger than the fluidized state in the settling char combustion chamber 4. Therefore, the fluidizing medium flows from the major part of the char combustion chamber 2 into the settling char combustion chamber 4 beyond the upper end of the partition wall 14 which is positioned near the interface of the fluidized bed. The fluidizing medium that has flowed into the settling char combustion chamber 4 moves downwardly (toward the furnace bottom) because of the relatively weakly fluidized state, i.e., the highly dense state, in the settling char combustion chamber 4, and then moves from the settling char combustion chamber 4 through the opening 25 in the lower end of the partition wall 15 near the furnace bottom into the gasification chamber 1. The fluidized state in the gasification chamber 1 near the partition wall 15 between the gasification chamber 1 and the settling char combustion chamber 4 is relatively stronger than the fluidized state in the settling char combustion chamber 4. This relatively strong fluidized state induces the fluidizing medium to move from the settling char combustion chamber 4 into the gasification chamber 1.

Similarly, the fluidized state in the char combustion chamber 2 near the partition wall 11 between the gasification chamber 1 and the char combustion chamber 2 is relatively stronger than the fluidized state in the gasification chamber 1. Therefore, the fluidizing medium flows through the opening 21 (submerged in the dense bed) in the partition wall 11 below the interface of the fluidized bed, preferably below the upper surface of the dense bed, into the char combustion chamber 2.

Generally, if two chambers A, B are divided from each other by a partition wall X whose upper end is positioned near the interface, a fluidizing medium moves between the two chambers A, B depending on the fluidized states in the chambers A, B near the partition wall X. For example, when the fluidized state in the chamber A is stronger than the fluidized state in the chamber B, the fluidizing medium flows from the chamber A into the chamber B beyond the upper end of the partition wall X. If chambers A, B are divided from each other by a partition wall Y whose lower end (submerged in the dense bed) is positioned below the interface, preferably below the upper surface of the dense bed, that is, by a partition wall Y which has an opening positioned below the interface or submerged in the dense bed, a fluidizing medium moves between the two chambers A, B depending on the fluidizing intensity in the chambers A, B near the partition wall Y. For example, when the fluidized state in the chamber A is stronger than the fluidized state in the chamber B, the fluidizing medium flows from the chamber B into the chamber A through the opening in the lower end of the partition wall Y. The movement of the fluidizing medium may be induced by the relatively strongly fluidized state of the fluidizing medium in the chamber A, or by the higher density of the fluidizing medium in the relatively weakly fluidized state in the chamber B than the density of the fluidizing medium in the chamber A. When the above movement of the fluidizing medium between the chambers occurs in one place, the mass balance between the chambers tend to be lost, but the fluidizing medium is caused to move between the chambers in another place in order to keep the mass balance.

With respect to a partition which defines one chamber and the relative relationship between the upper end of the partition wall X and the lower end of the partition wall Y, the upper end of the partition wall X beyond which the fluidizing medium moves is positioned vertically above the lower end of partition wall Y below which the fluidizing medium moves. By arranging the above structure, when the fluidizing medium fills the chamber and is fluidized, and the amount of fluidizing medium filling the chamber is appropriately determined, the upper end can be positioned near the interface of the fluidized bed and the lower end can be positioned so as to be submerged in the dense bed. By appropriately setting up the intensity of the fluidization near the partition wall as described above, the fluidizing medium can be moved in a desired direction with respect to the partition wall X or the partition wall Y, and the flow of gases between the two chambers divided from each other by the partition wall Y can be eliminated.

The above method is applied to the gasification furnace shown in FIG. 1 as follows: The char combustion chamber 2 and the heat recovery chamber 3 are divided from each other by the partition wall 12 whose upper end is positioned near the height of the interface and lower end submerged in the dense bed, and the fluidized state in the char combustion chamber 2 near the partition wall 12 is stronger than the fluidized state in the heat recovery chamber 3 near the partition wall 12. Therefore, the fluidizing medium flows from the char combustion chamber 2 into the heat recovery chamber 3 beyond the upper end of the partition wall 12, and then moves from the heat recovery chamber 3 under the lower end of the partition wall 12 into the char combustion chamber 2.

The char combustion chamber 2 and the gasification chamber 1 are divided from each other by the partition wall 15 whose lower end is submerged in the dense bed. The settling char combustion chamber 4 is disposed in the char combustion chamber 2 near the partition wall 15, and the settling char combustion chamber 4 is surrounded by the partition wall 14 whose upper end is positioned near the height of the interface and the partition wall 15. The fluidized state in the major part of the char combustion chamber 2 near the partition wall 14 is stronger than the fluidized state in the settling char combustion chamber 4 near the partition wall 14. Therefore, the fluidizing medium flows from the major part of the char combustion chamber 2 into the settling char combustion chamber 4 beyond the upper end of the partition wall 14. With this arrangement, the fluidizing medium which has flowed into the settling char combustion chamber 4 moves from the settling char combustion chamber 4 under the lower end of the partition wall 15 into the gasification chamber 1 in order to maintain a mass balance at least. At this time, if the fluidized state in the gasification chamber 1 near the partition wall 15 is stronger than the fluidized state in the settling char combustion chamber 4 near the partition wall 15, then the movement of the fluidizing medium is promoted by an inducing function.

The gasification furnace 1 and the major part of the char combustion chamber 2 are divided from each other by the second partition wall 11 whose lower end is submerged in the dense bed. The fluidizing medium which has moved from the settling char combustion chamber 4 into the gasification furnace 1 moves under the lower end of the partition wall 11 into the char combustion chamber 2 in order to maintain the aforementioned mass balance. At this time, if the fluidized state in the char combustion chamber 2 near the partition wall 11 is stronger than the fluidized state in the gasification furnace 1 near the partition wall 11, then the fluidizing medium moves not only to maintain the aforementioned mass balance, but also is induced to move into the char combustion chamber 2 due to the strongly fluidized state.

In the embodiment shown in FIG. 1, the fluidizing medium descends in the settling char combustion chamber 4 which is part of the char combustion chamber 2. A similar structure may be provided as a settling gasification chamber (not shown) in part of the gasification chamber 1, specifically, at the opening 21. That is, the fluidized state in the settling gasification chamber is made relatively weaker than the fluidized state in the major part of the gasification chamber to cause the fluidizing medium in the major part of the gasification chamber to flow beyond the upper end of the partition wall into the settling gasification chamber, and the settled fluidizing medium moves through the opening 21 into the char combustion chamber. At this time, the settling char combustion chamber 4 may be, or may not be, provided together with the settling gasification chamber. By employing the settling gasification chamber, as is the case of the gasification furnace shown in FIG. 1, the fluidizing medium moves from the char combustion chamber 2 through the opening 25 into the gasification chamber 1, and then moves from the gasification chamber 1 through the opening 21 into the char combustion chamber 2.

The heat recovery chamber 3 is uniformly fluidized, and usually maintained in a fluidized state which is, at maximum, weaker than the fluidized state in the char combustion chamber 2 in contact with the heat recovery chamber. The velocity of the fluidizing gases in the heat recovery chamber 3 is controlled to be in a range from 0 to 3 Umf, and the fluidizing medium is fluidized weakly, forming a settled fluidized layer. The space velocity 0 Umf represents that the fluidizing gases is stopped. In this manner, the heat recovery in the heat recovery chamber 3 can be minimized. That is, the heat recovery chamber 3 is capable of adjusting the amount of recovered heat in a range from maximum to minimum levels by changing the fluidized state of the fluidizing medium. In the heat recovery chamber 3, the fluidization can be initiated and stopped, or adjusted in its intensity uniformly throughout the whole chamber, the fluidization can be stopped in a certain area of the chamber and performed in the other area, or the fluidization in the certain area of the chamber can be adjusted in its intensity.

All the partition walls between the chambers are ordinarily vertical walls. If necessary, a partition wall may have a bulge. For example, as shown in FIG. 2, the partition walls 12, 14 may have bulges 32 near the interface of the fluidized bed in the char combustion chamber 2 for changing the direction of flow of the fluidizing medium near the partition walls to promote the internal revolving flows. Relatively large incombustibles contained in the fuel are discharged from an incombustible discharge port 33 provided in the furnace bottom of the gasification chamber 1. The furnace bottom in each of the chambers may be horizontal, but the furnace bottom may be slanted along the flow patterns of the fluidizing medium in the vicinity of the furnace bottom so that the flow of the fluidizing medium will not be kept stagnant, as shown in FIG. 2. An incombustible discharge port may be provided in not only the furnace bottom of the gasification chamber 1, but also the furnace bottom of the char combustion chamber 2 or the heat recovery chamber 3.

Most preferably, the fluidizing gas in the gasification chamber 1 comprises a compressed generated gas in recycled use. In the case that the fluidizing gas comprises a generated gas, the gas discharged from the gasification chamber is the gas generated only from the fuel, and hence a gas of very high quality can be obtained. In the case that the fluidizing gas cannot be a generated gas, it may comprise a gas containing as little oxygen as possible (oxygen-free gas), such as water steam or the like. If the bed temperature of the fluidizing medium is lowered due to the endothermic reaction upon gasification, then oxygen or an oxygen containing gas, e.g., air, may be supplied, in addition to the oxygen-free gas, to combust part of the generated gas. The fluidizing gas supplied to the char combustion chamber 2 comprises an oxygen containing gas, e.g., air or a mixed gas of oxygen and steam, required to combust the char. The fluidizing gas supplied to the heat recovery chamber 3 comprises air, water steam, a combustion exhaust gas, or the like.

Figure 3A:
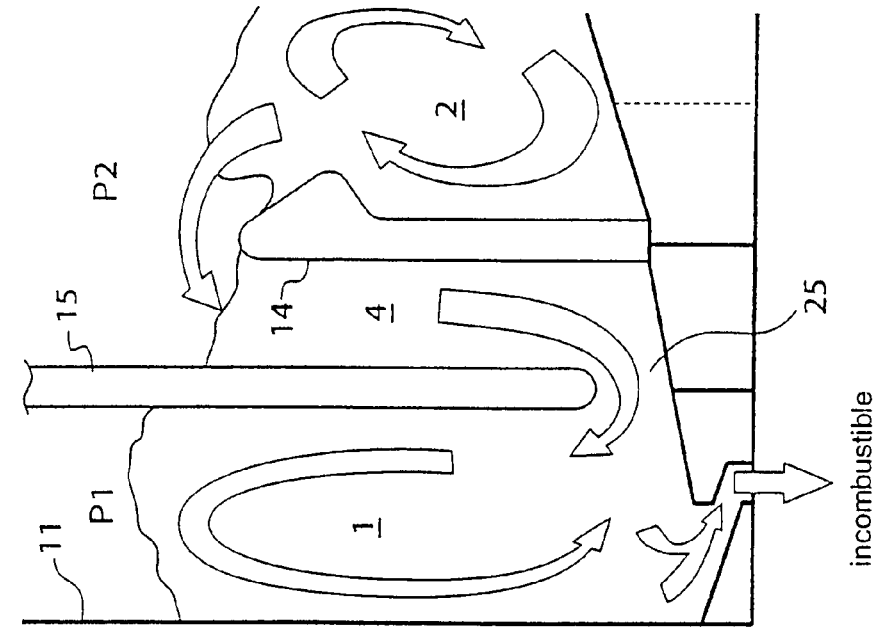
FIGS. 3A and 3B are schematic diagrams showing a pressure control function of the integrated gasification furnace according to the present invention.
Figure 3B:
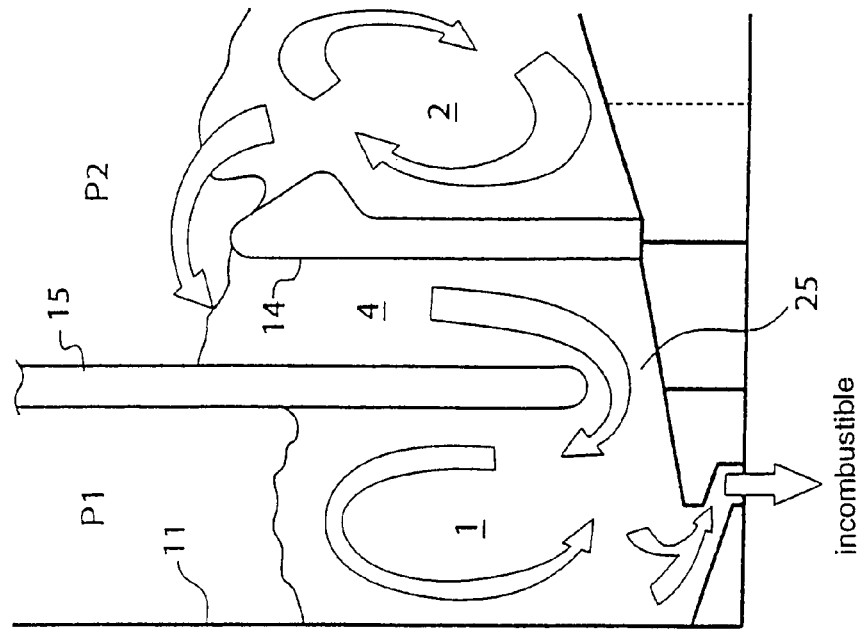

Areas above the surfaces of the fluidized beds (the upper surfaces of the splash zones) in the gasification furnace 1 and the char combustion chamber 2, i.e., the freeboards, are completely divided by the partition walls. More specifically, areas above the surfaces of the dense beds of the fluidized beds, i.e., the splash zones and the freeboards, are completely divided by the partition walls. Therefore, as shown in FIGS. 3A and 3B, even when the pressures P1, P2 in the char combustion chamber 2 and the gasification furnace 1 are brought out of balance, the pressure difference can be absorbed by a slight change in the difference between the positions of the interfaces of the fluidized beds in the chambers, or the difference between the positions of the surfaces of the dense beds (i.e., the bed height difference. Specifically, since the gasification furnace 1 and the char combustion chamber 2 are divided from each other by the partition wall 15, even when the pressures P1, P2 in these chambers are varied, the pressure difference can be absorbed by the bed height difference until either one of the beds is lowered to the upper end of the opening 25. Therefore, an upper limit for the pressure difference (P1–P2 or P2–P1) between the freeboards in the char combustion chamber 2 and the gasification furnace 1 which can be absorbed by the bed height difference is substantially equal to the difference between the head of the gasification chamber fluidized bed from the upper end of the opening 25 and the head of the char combustion chamber fluidized bed from the upper end of the opening 25.

In the integrated gasification furnace 101 according to the embodiment described above, the three chambers, i.e., the gasification chamber, the char combustion chamber, and the heat recovery chamber, which are divided from each other by the partition walls, are disposed in one fluidized-bed furnace, with the char combustion chamber and the gasification chamber being positioned adjacent to each other, and the char combustion chamber and the heat recovery chamber being positioned adjacent to each other. Inasmuch as the integrated gasification furnace 101 differs from the two-bed pyrolysis reactor system in that a large amount of fluidizing medium can be circulated between the char combustion chamber and the gasification chamber, the quantity of heat for gasification can sufficiently be supplied only by the sensible heat of the fluidizing medium. It is, therefore, possible to realize, with utmost ease, the principle of the power generation system using an improved pressurized fluidized-bed furnace so that it is possible to obtain generated gases in as small an amount as possible and having as high a calorific value as possible.

In this embodiment, since a complete seal is provided between char combustion gases and generated gases, the pressure balance between the gasification chamber and the char combustion chamber is controlled well without causing the combustion gases and the generated gases to be mixed with each other and degrading the properties of the generated gases.

The fluidizing medium as the heat medium and the char flow from the gasification chamber 1 into the char combustion chamber 2, and the same amount of fluidizing medium returns from the char combustion chamber 2 to the gasification chamber 1. Therefore, input and output of the fluidizing medium is naturally balanced. It is not necessary to mechanically deliver, with a conveyor or the like, the fluidizing medium from the char combustion chamber 2 back into the gasification chamber 1. Therefore, the present embodiment is free of the difficulty in handling high-temperature particles and a large sensible heat loss.

As described above, according to the present embodiment as shown in FIG. 1, in the integrated gasification furnace having three functions of pyrolysis and gasification of the fuel, char combustion, and submerged heat recovery coexistent in one fluidized-bed furnace, for supplying a high-temperature fluidizing medium in the char combustion chamber as the heat medium to supply a heat source for pyrolysis and gasification to the gasification chamber, the gasification chamber and the heat recovery chamber are fully divided from each other by the partition wall extending from the furnace bottom to the ceiling or provided so as not to be in contact with each other, the gasification chamber and the char combustion chamber are fully divided from each other by the partition wall above the interface of the fluidized bed, and the intensity of the fluidized state in the gasification chamber near the partition wall and the intensity of the fluidized state in the char combustion chamber are kept in a predetermined relationship. Therefore, the fluidizing medium is moved from the char combustion chamber through the opening provided in the partition wall near the furnace bottom into the gasification chamber, and the fluidizing medium is moved from the gasification chamber into the char combustion chamber.

In this embodiment, since the gasification chamber and the char combustion chamber are fully divided from each other by the partition wall above the interface of the fluidized bed, even when the gas pressures in these chambers are changed, gas seal between these chambers is kept, and the combustion gases and the generated gases are prevented from being mixed with each other. Therefore, no special control is required to achieve a gas seal between the gasification chamber and the char combustion chamber. By keeping the predetermined intensity of the fluidized state in the gasification chamber near the partition wall and the intensity of the fluidized state in the char combustion chamber, the fluidizing medium can stably be moved in a large amount from the char combustion chamber through the opening provided in the partition wall near the furnace bottom into the gasification chamber. Therefore, no mechanical means for handling high-temperature particles is required to move the fluidizing medium from the char combustion chamber into the gasification chamber.

In the integrated gasification furnace, a weakly fluidized region in the char combustion chamber which is in contact with the gasification chamber may serve as the settling char combustion chamber, which may be separated from the major part of the char combustion chamber by the partition wall which extends from the furnace bottom to a position near the interface of the fluidized bed. A strongly fluidized region and a weakly fluidized region may be defined in each of the char combustion chamber, the settling char combustion chamber, and the gasification chamber for producing internal revolving flows of the fluidizing medium in each of the chambers.

In the above integrated gasification furnace, the heat recovery chamber may be disposed in contact with the strongly fluidized region in the char combustion chamber, the heat recovery chamber and the char combustion chamber may have openings near the furnace bottom, and may be divided from each other by the partition wall whose upper end reaches a position near the interface of the fluidized bed, and the fluidized state in the char combustion chamber near the partition wall may be relatively stronger than the fluidized state in the heat recovery chamber to produce forces to circulate the fluidizing medium. Alternatively, the heat recovery chamber may be disposed in contact with the strongly fluidized region in the settling char combustion chamber, the heat recovery chamber and the settling char combustion chamber may have openings near the furnace bottom, and may be divided from each other by the partition wall whose upper end reaches a position near the interface of the fluidized bed, and the fluidized state in the settling char combustion chamber near the partition wall may be relatively stronger than the fluidized state in the heat recovery chamber to produce forces to circulate the fluidizing medium.

The fluidizing gas in the gasification chamber comprises an oxygen-free gas. The oxygen-free gas may comprise a gas which does not contain oxygen at all, e.g., water steam or the like.

The furnace bottom in each of the gasification chamber, the char combustion chamber, and the heat recovery chamber may be slanted along the flow patterns of the fluidizing medium in the vicinity of the furnace bottom. The temperature of the gasification chamber may be adjusted by controlling the fluidized state in the weakly fluidized region in the char combustion chamber which is in contact with the gasification chamber.

Figure 4:
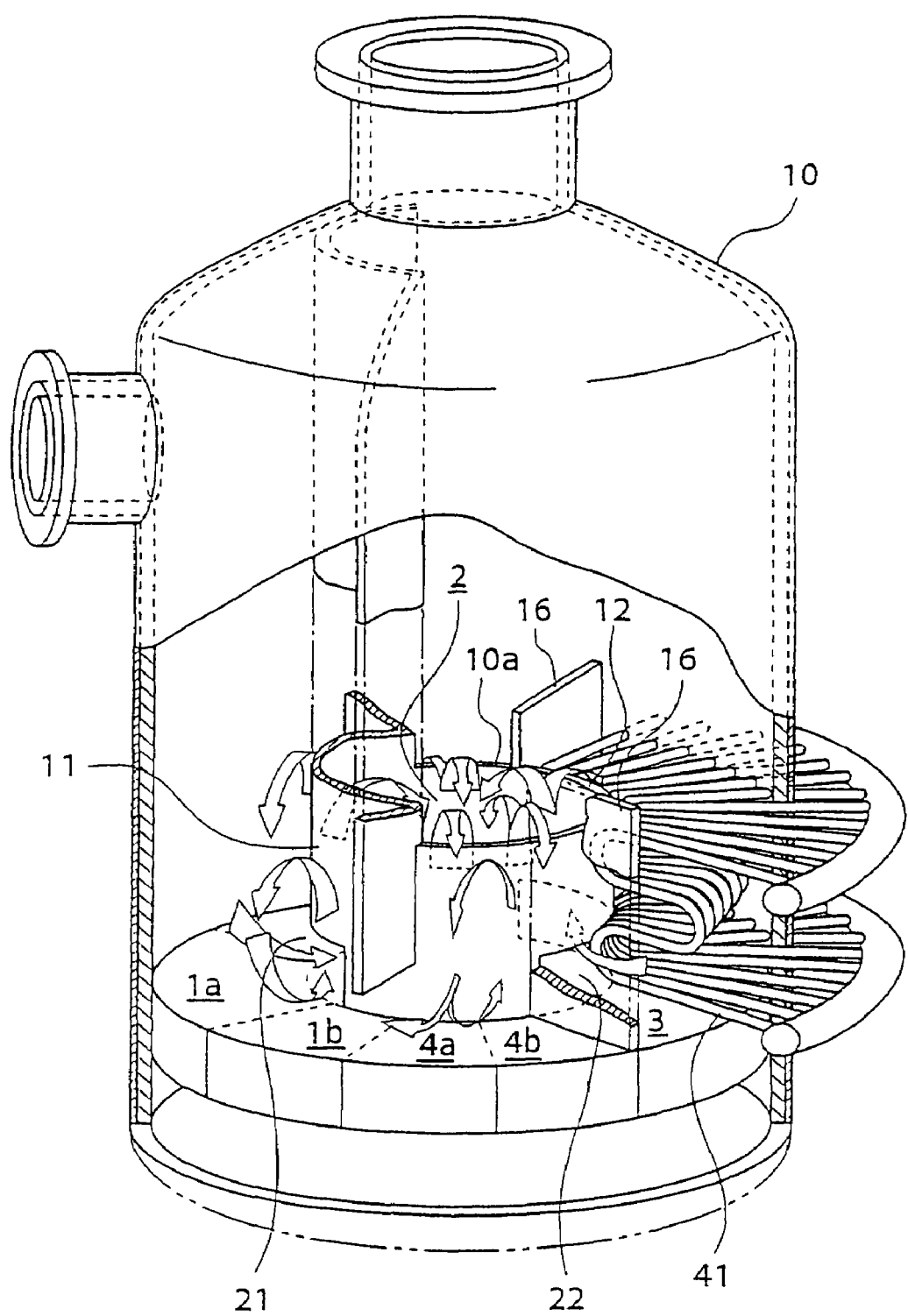
FIG. 4 is a view showing a cylindrical furnace which embodies the integrated gasification furnace according to the present invention.

FIG. 4 shows an embodiment in which the present invention is applied to a cylindrical furnace having a vertical axis. A cylindrical integrated gasification furnace 10 houses a cylindrical partition wall 10a concentric with an outer wall thereof, the partition wall 10a defining a char combustion chamber 2 therein. Settling char combustion chambers 4, a gasification chamber 1, and a heat recovery chamber 3, each having a sectorial shape (a shape bounded between two radius in an annular area defined between two concentric circles), are disposed in an annular area extending outside of the partition wall 10a surrounding the char combustion chamber 2. The gasification chamber 1 and the heat recovery chamber 3 are positioned opposite to each other with the settling char combustion chambers 4 interposed therebetween. The gasification furnace having the above cylindrical shape can easily be housed in a pressure vessel as with an integrated gasification furnace shown in FIG. 11. The integrated gasification furnace 10 has a basic structure that is similar to the gasification furnace 101 shown in FIG. 1, except that it is pressurized and is arranged so that it can easily be housed in a pressure vessel 50.

Figure 5:
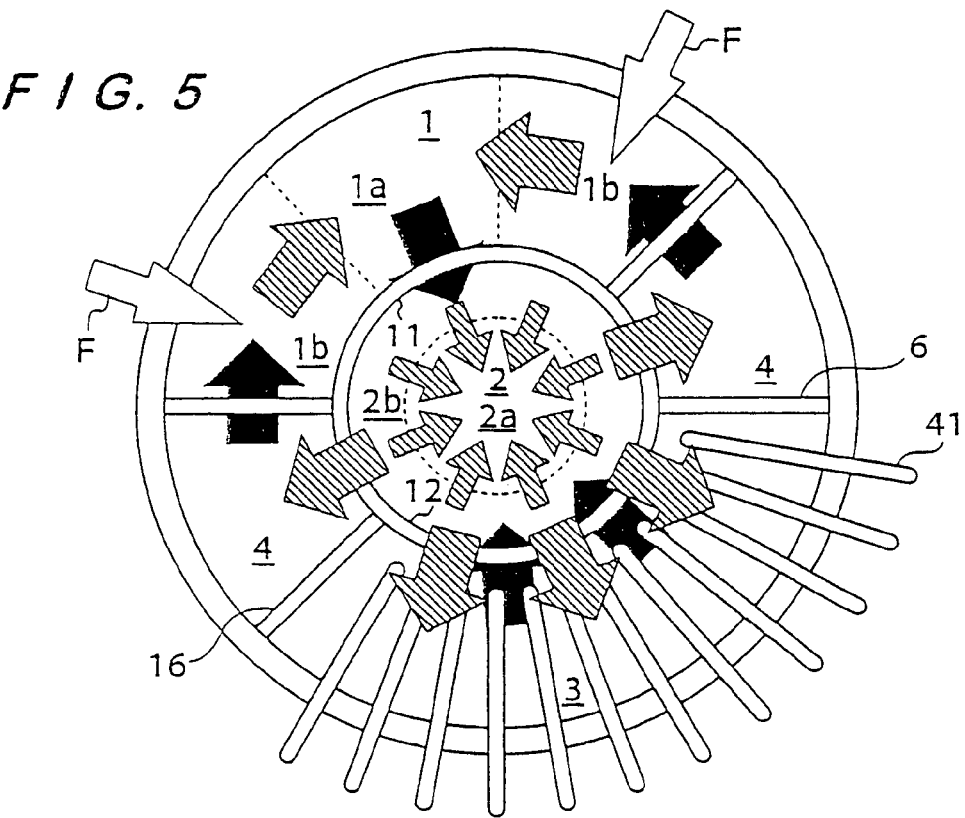
FIG. 5 is a horizontal cross-sectional view of a fluidized bed of the cylindrical furnace shown in FIG. 4.

FIG. 5 is a horizontal cross-sectional view of a fluidized bed in the embodiment shown in FIG. 4. The char combustion chamber 2 is positioned at the center, the gasification chamber 1 at a peripheral area, and the heat recovery chamber 3 opposite to the gasification chamber 1, with the two sectorial settling char combustion chambers 4 being interposed between the gasification chamber 1 and the heat recovery chamber 3. There are a plurality of gas diffusers positioned at the furnace bottom of the sectorial gasification chamber 1, which has strongly fluidized regions 1b at its opposite ends for providing an increased space velocity and a weakly fluidized region 1a at its center for providing a reduced space velocity. The fluidizing medium in the gasification furnace forms internal revolving patterns which rise in the strongly fluidized regions 1b and settle in the weakly fluidized region 1a. The revolving flows diffuse a fuel F charged into the gasification furnace 1 wholly in the gasification furnace 1, which is thus effectively utilized.

The fluidizing gas in the gasification furnace 1 comprises mainly a generated gas in recycled use or a gas free of oxygen, such as water steam or a combustion exhaust gas. When the temperature of the gasification chamber is excessively reduced, oxygen or an oxygen containing gas, e.g., air, may be mixed with the fluidizing gas. A partition wall 11 between the gasification chamber 1 and the char combustion chamber 2 has an opening 21 provided therein near the furnace bottom, and fully divides the gasification chamber 1 and the char combustion chamber 2 from each other up to the ceiling except for the opening 21. The fuel F which is pyrolyzed and gasified in the gasification chamber 1 flows through the opening 21 into the char combustion chamber 2. The opening 21 may be provided fully across the gasification chamber 1, or may be provided only in the weakly fluidized region. In FIG. 5, black arrows indicate paths of movement of the fluidizing medium in settling flows through openings in the partition walls at the furnace bottom, and gray arrows indicate paths of movement of the fluidizing medium in rising flows over the upper ends of the partition walls.

The operating temperature of the gasification furnace 1 can be adjusted to an optimum temperature with each fuel. If the fuel has a relatively low gasification rate and produces a large amount of char, such as coal, then the gasification furnace 1 can obtain a high gasification rate by maintaining a temperature ranging from 800 to 900° C. therein. If the fuel produces a small amount of char, such as municipal waste, then the gasification furnace 1 can obtain a stable operation while removing chlorine and controlling a volatile release rate, by maintaining a bed temperature in the range from 350 to 450° C.

The gas diffusers at the furnace bottom of the char combustion chamber 2 are divided into those at a central region and those at a peripheral region, and diffuse the fluidizing gases such that the central region forms a weakly fluidized region 2a and the peripheral region forms a strongly fluidized region 2b. The strongly fluidized region 2b forms therein a rising fluidized bed in which the fluidizing medium ascends and the weakly fluidized region 2a forms therein a settling fluidized bed in which the fluidizing medium descends.

The char combustion chamber 2 should be maintained at as high a temperature as possible, preferably at a bed temperature of around 900° C., for promoting char combustion and supplying sensible heat to the gasification chamber 1. In the case of fluidized bed combustion accompanying an endothermic reaction therein, generally, the possibility of agglomeration formation increases in the operation at a temperature of around 900° C. In this embodiment, however, the revolving flows in the char combustion chamber promote heat diffusion and char diffusion, making it possible to combust char stably without agglomeration formation. The agglomeration refers to a solidified lump originated in melted ash of the fluidizing medium and the fuel.

The settling char combustion chambers 4 should preferably be kept wholly in a weakly fluidized state in order to form a settling fluidized layer. However, as shown in FIG. 4, each of the settling char combustion chambers 4 may have a weakly fluidized region 4a and a strongly fluidized region 4b for promoting heat diffusion, and an internal revolving flow may be produced to form a settling fluidized layer in a region being in contact with the gasification furnace 1.

In this embodiment, as shown in FIG. 4, partitions 16 between the settling char combustion chambers 4 and the heat recovery chamber 3 have their lower ends reach the furnace bottom and their upper ends located in a position much higher than the interface of the fluidized bed for preventing the fluidizing medium from flowing between the settling char combustion chambers 4 and the heat recovery chamber 3. This is because for a fuel containing high fixed carbon such as coal, the fluidizing medium flowing from the settling char combustion chambers into the gasification chamber should preferably have a temperature which is as high as possible, and it is not preferable for the fluidizing medium cooled in the heat recovery chamber 3 to be mixed with the high-temperature fluidizing medium that is to flow into the gasification chamber 1, or for the high-temperature medium to flow into the heat recovery chamber 3.

Figure 6:
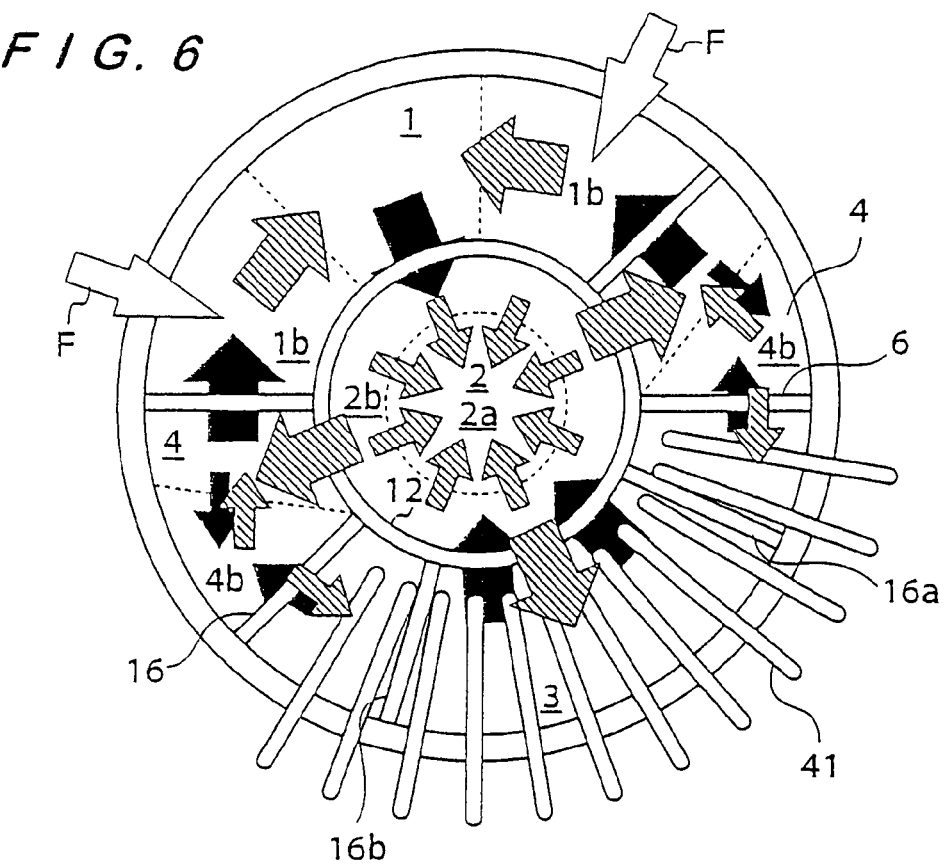
FIG. 6 is a horizontal cross-sectional view showing a modification of the fluidized bed shown in FIG. 5.

In the case that the integrated gasification furnace according to this embodiment is used for gasification combustion of waste materials, the partition walls 16 may have upper ends positioned near the interface of the fluidized bed, and openings provided therein near the furnace bottom for causing the fluidizing medium to circulate between the settling char combustion chambers 4 and the heat recovery chamber 3. This is because for a fuel which produces char at a low rate, such as wastes, the combustion temperature in the char combustion chamber cannot be maintained unless the temperature of the gasification chamber is lowered to reduce the gas production rate. In this case, as shown in FIG. 6, a gas diffuser at the furnace bottom of the heat recovery chamber 3 is divided, and the heat recovery chamber 3 is separated by partition walls 16a for using one part with the char combustion chamber and another part as the settling char combustion chamber, so that the temperatures of the char combustion chamber and the gasification chamber can be controlled independently of each other. A gas diffuser at the furnace bottom of each of the settling char combustion chambers 4 may be divided for forming strongly fluidized regions 4b in contact with the heat recovery chamber 3.

Radial submerged heat transfer pipes 41 are disposed in the heat recovery chamber 3. The fluidizing medium flowing from the char combustion chamber 2 beyond the partition wall 12 is cooled by the heat transfer pipes 41, and then returns through the opening 22 in the lower portion of the partition wall 12 back into the char combustion chamber 2. Since the pitch or spacing of the submerged heat transfer pipes extends toward the peripheral region, the resistance charged to the fluidizing medium which flows across the submerged heat transfer pipes is smaller in the peripheral region. Therefore, the fluidizing medium flowing into the char combustion chamber 2 is uniformly dispersed in the peripheral region, resulting in effective utilization of the entire volume of the heat recovery chamber 3. Therefore, the integrated gasification furnace is of a compact structure as a whole.

Figure 7:
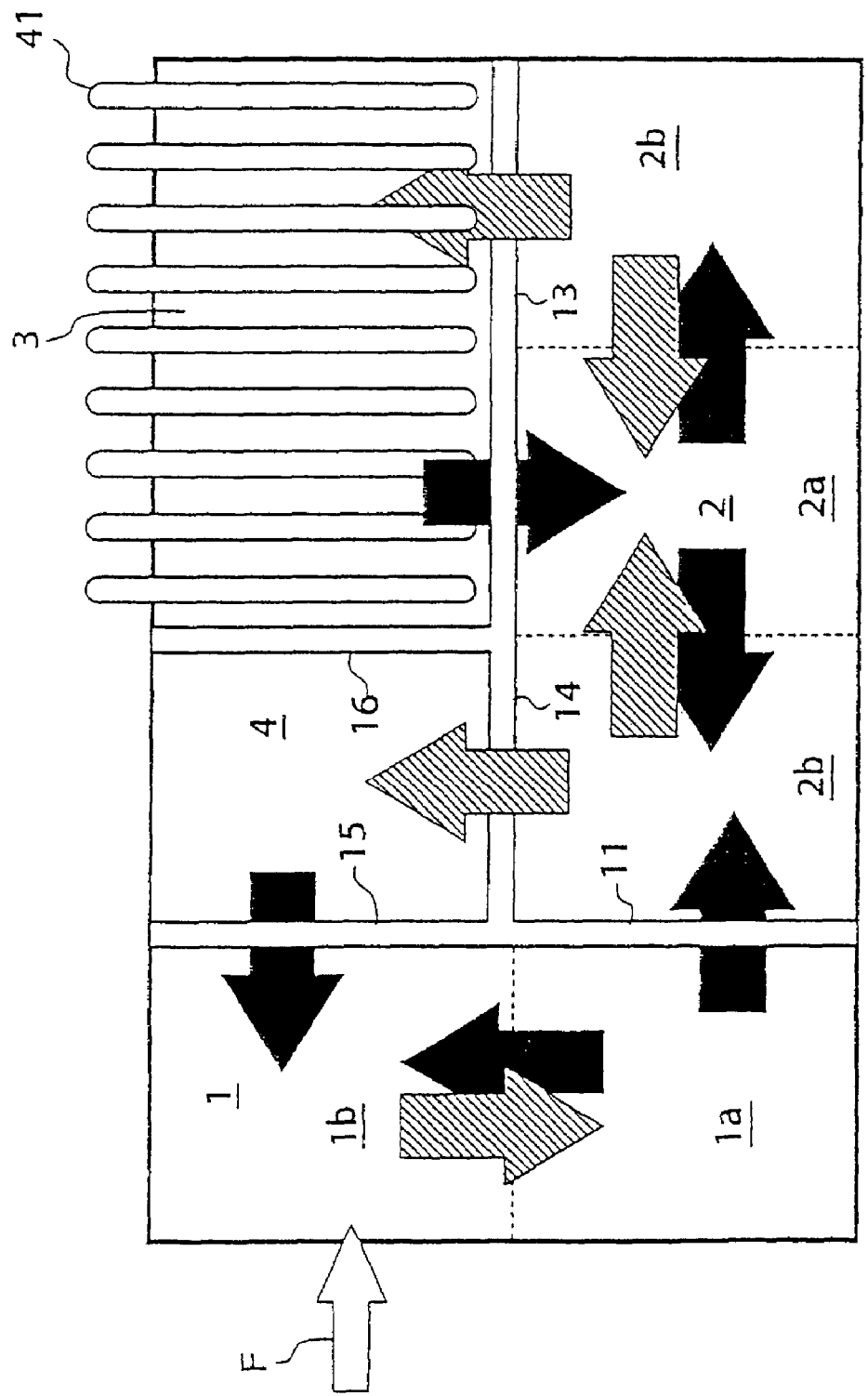
FIG. 7 is a horizontal cross-sectional view of a rectangular furnace which embodies the integrated gasification furnace according to the present invention.

FIG. 7 shows a rectangular furnace which embodies the integrated gasification furnace according to the present invention. When the integrated gasification furnace is used under atmospheric pressure, the outer wall of the gasification furnace is not required to have a withstand-pressure structure. For this reason, the rectangular furnace is preferable also from a viewpoint of manufacturing.

In the case that the fuel type is suitable for operating the integrated gasification furnace at a reduced temperature, as shown in FIG. 7, the heat recovery chamber 3 is divided into the char combustion chamber and the settling char combustion chamber by partition walls 13, 16, so that the temperature of the fluidizing medium to be supplied to the gasification chamber 1 can be controlled independently from the temperature in the char combustion chamber 2.

Figure 8:
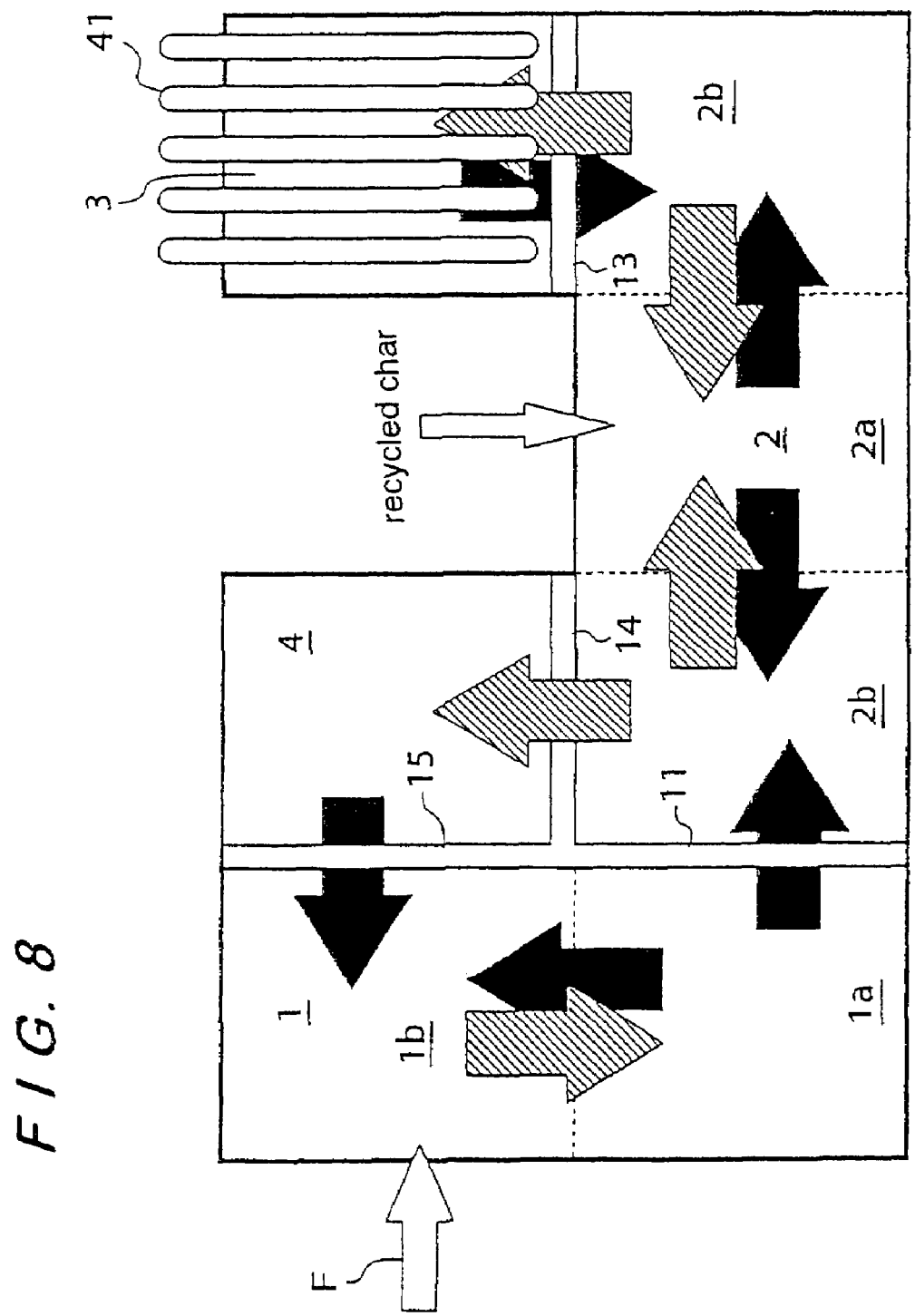
FIG. 8 is a horizontal cross-sectional view showing a modification of the rectangular furnace shown in FIG. 7.

In the rectangular furnace shown in FIG. 7, both the fluidizing medium in the weakly fluidized region in the char combustion chamber 2 and the fluidizing medium in the heat recovery chamber 3 which is in contact with the weakly fluidized region in the char combustion chamber 2 are in the weakly fluidized state. Therefore, the fluidizing medium does not have a definite direction to move in, and may not effectively perform its function as a heat medium. In such a case, as shown in FIG. 8, the region of the heat recovery chamber 3 which is in contact with the weakly fluidized region in the char combustion chamber 2 may be opened outwardly of the furnace, and the open region may be used effectively, e.g., by providing a supply port for recycled char.

Figure 9:
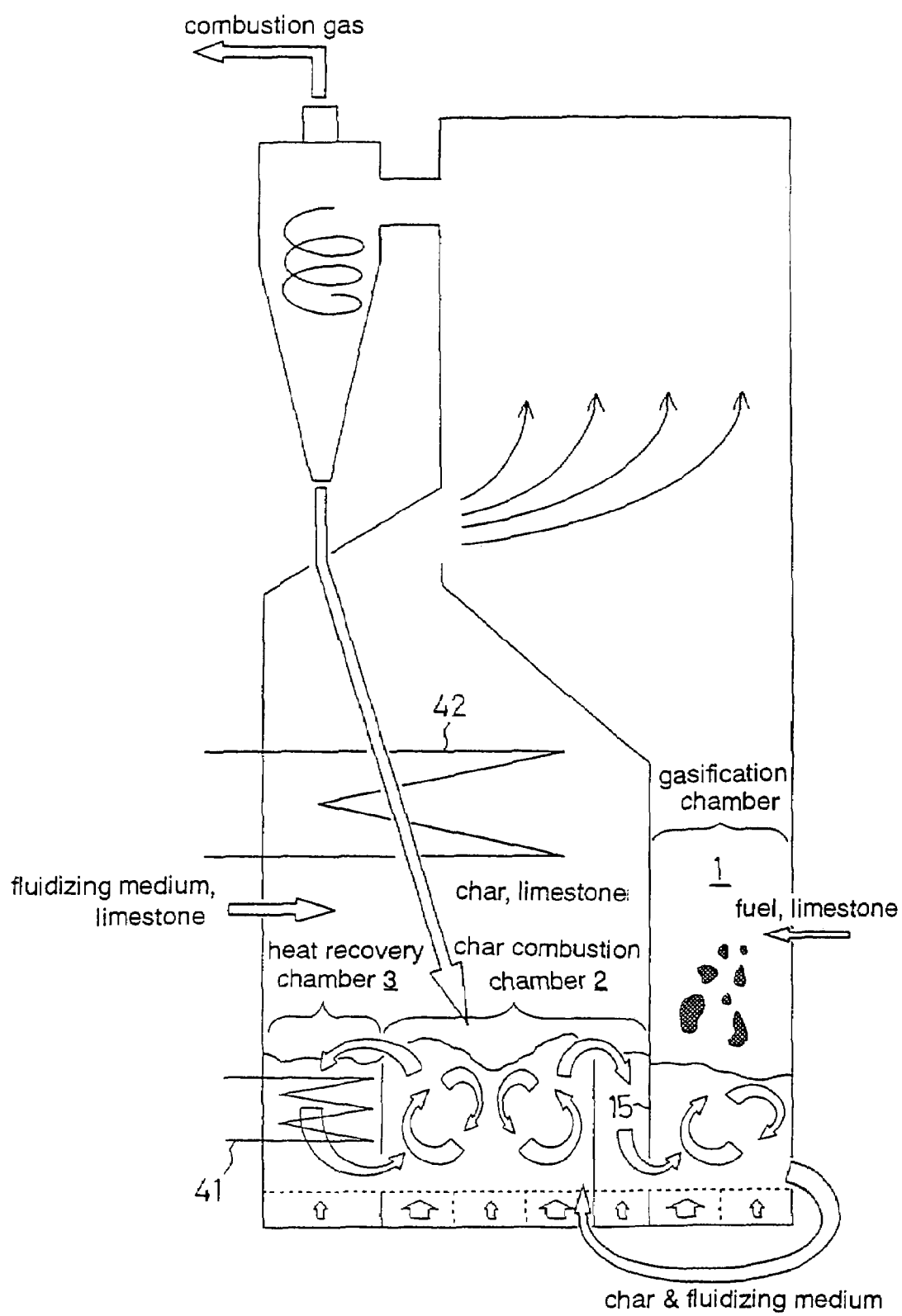
FIG. 9 is a schematic diagram of a normal-pressure-type integrated gasification furnace according to the present invention.

FIG. 9 shows an embodiment in which the present invention is applied to an atmospheric-pressure-type fluidized-bed furnace.

In this embodiment, even if the fuel contains chlorine, the submerged heat transfer pipes 41 in the heat recovery chamber 3 and heat transfer pipes 42 in the freeboard of the char combustion chamber are not almost exposed to the chlorine, so that the steam temperature can be increased to 350° C. or higher, which is the maximum steam temperature in a conventional waste incinerator, or even to 500° C. or higher. In a region where the combustion gases are blown from the char combustion chamber 2 into the gasification chamber 1, remaining oxygen in the combustion gases reacts with combustible gases, resulting in a high temperature. In this region, therefore, the combustion of the char and the decarboxylation of limestone are promoted for enhancing combustion efficiency and desulfurization efficiency. A pressure loss caused when the combustion gases are blown from the char combustion chamber 2 into the gasification chamber 1 ranges from about 200 to 400 mmAq. Since the head of the fluidized bed from the lower end of the partition wall 15 to the interface of the fluidized bed is normally in the range from 1500 to 2000 mmAq, a pressure difference can automatically be maintained when the bed height in the gasification chamber is slightly lower than the bed height in the char combustion chamber, as shown in FIGS. 3A and 3B, and hence no special control is required.

Figure 10:
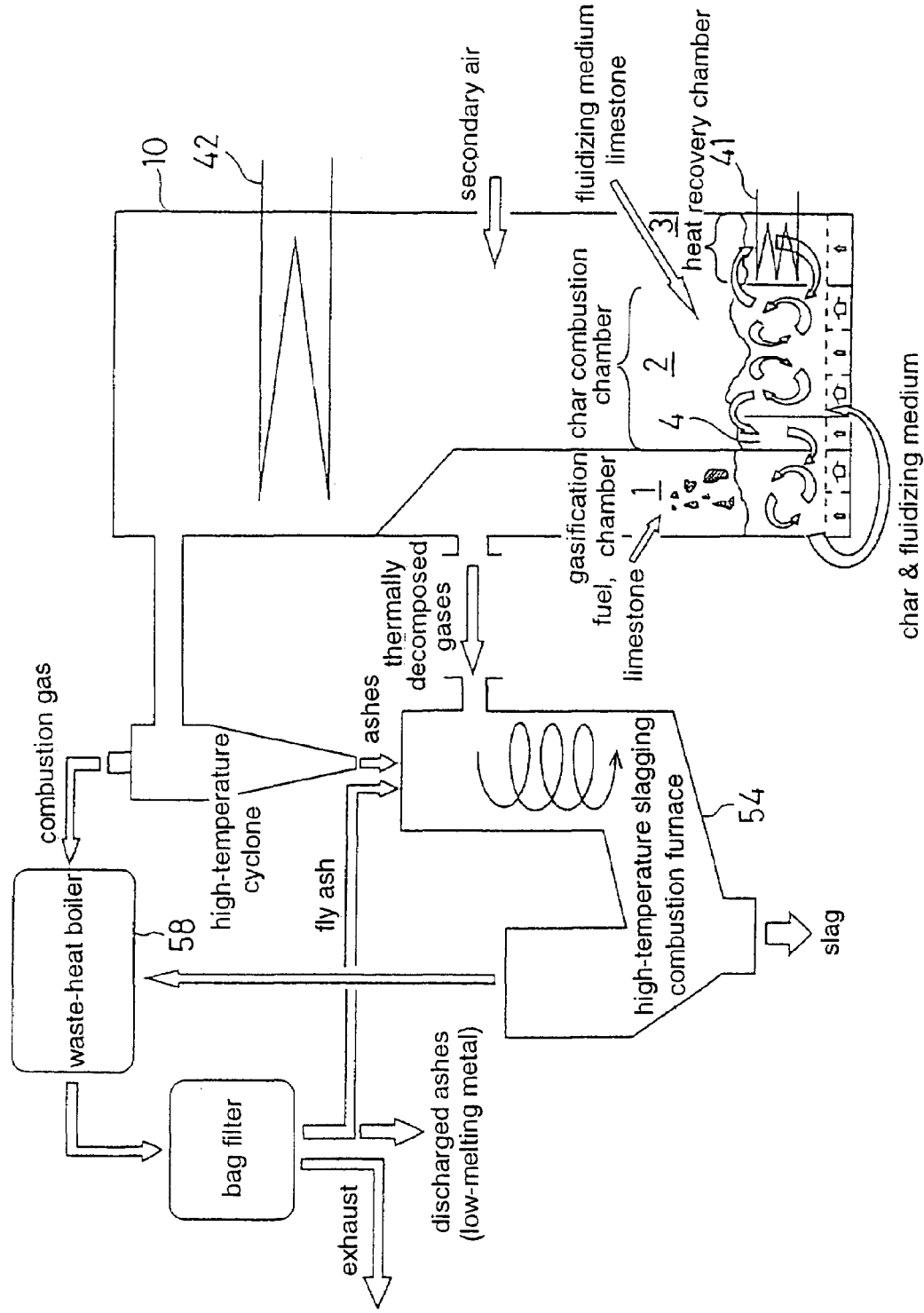
FIG. 10 is a schematic diagram of a combined cycle power generation system which employs the integrated gasification furnace shown in FIG. 9.

FIG. 10 shows a process flow for melting ash by using a gas generated in the integrated gasification furnace according to the present invention. In this embodiment, the furnace 10 at atmospheric pressure has the gasification chamber 1, the char combustion chamber 2, the heat recovery chamber 3, and the settling char combustion chamber 4 provided therein. When a large amount of fluidizing medium is circulated through these chambers, the integrated gasification furnace operates stably in the same manner as the above embodiments. In this embodiment, part of the pyrolysis gases from the gasification chamber 1 is introduced into a slagging combustion furnace 54 for melting the ash. A waste boiler removes heat from the remaining pyrolysis gases together with the char combustion gas, and the remaining pyrolysis gases are dedusted by a deduster 52, and then discharged outside.

Figure 11:
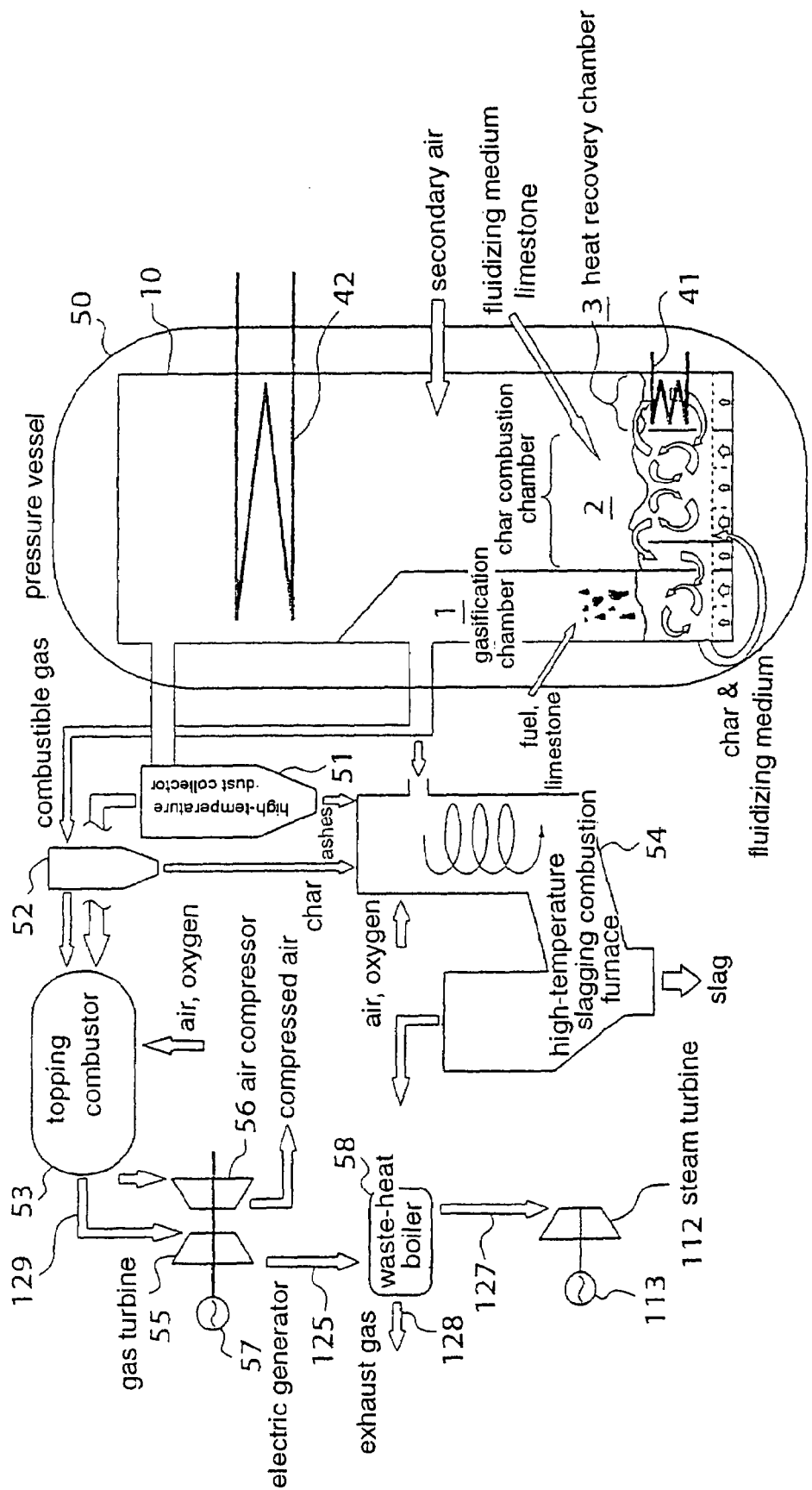
FIG. 11 is a schematic diagram of a combined cycle power generation system which employs the integrated gasification furnace according to the present invention.

FIG. 11 shows a combined cycle power generation system which employs the integrated gasification furnace according to the present invention.

The integrated gasification furnace 10 is disposed in a pressure vessel 50 and operated under pressurized condition. The integrated gasification furnace 10 may have an integral structure such that the outer wall of the integrated gasification furnace 10 works as the pressure vessel. Part of the combustible gases generated in the gasification furnace 1 is supplied to a slagging combustion furnace 54 under normal pressure, and used as the heat for melting ash. Remaining combustible gases, together with the char combustion gases, are dedusted by a high-temperature dust collector 51, and then led to a topping combustor 53 as a stabilizing combustion chamber, which generates high-temperature exhaust gases to be supplied to a gas turbine 55 as an energy recovery device. The gas turbine 55 has a structure identical to a gas turbine of an ordinary gas turbine unit, and is called a power recovery turbine.

Heat transfer pipes 42 may be installed in an upper portion of the char combustion chamber 2. Even if the fuel contains chlorine, since almost all of the chlorine is contained in gases generated in the gasification furnace 1, the char combustion gases contain almost no chlorine in this embodiment. Therefore, the heat transfer pipes 42 may be used as a steam superheater to superheat steam at 500° C. or higher. Inasmuch as submerged heat transfer pipes 41 installed in the heat recovery chamber 3 are less exposed to a corrosive environment than the heat transfer pipes 42, the submerged heat transfer pipes 41 may be used as a steam superheater to superheat steam at higher temperatures than the heat transfer pipes 42. If the concentration of chlorine, in the fuel is relatively high, then since the concentration of chlorine in the combustible gases is also high, the whole amount of combustible gases is led to the slagging combustion furnace 54 to prevent the topping combustor 53 and the gas turbine 55 from being corroded.

The power generation system which employs the pressurized fluidized-bed furnace shown in FIG. 11 operates as follows. First of all, coal is gasified in the pressurized gasification furnace, and generated unburned carbon (so-called char) is combusted in the pressurized char combustion chamber 2. Combustion gases from the char combustion chamber 2 and generated gases from the gasification chamber 1 are respectively cleaned by the high-temperature dust collectors 51, 52, and then mixed and combusted in the topping combustor 53, which produces high-temperature gases to drive the gas turbine 55. Each of the high-temperature dust collectors 51, 52 may comprise a ceramic filter, a metal filter of heat-resisting alloy, a cyclone separator, or the like.

As for the power generation system which employs the pressurized fluidized-bed furnace, it is important how the temperature of gases flowing into the gas turbine 55 can be increased to an allowable maximum temperature designed for each gas turbine. The greatest limitation imposed on increasing the temperature of gases flowing into the gas turbine 55 is cleaning of the generated gases. The cleaning of the generated gases is carried out by desulfurization, for example. The desulfurization is required to protect the blades of the gas turbine, for example.

For cleaning the generated gases, it is necessary to cool the generated gases usually to about 450° C. in view of an optimum temperature for a desulfurizing reaction in a reducing atmosphere. On the other hand, the gas temperature at the inlet of the gas turbine should be as high as possible because the efficiency of the gas turbine becomes higher as the gas temperature becomes higher. At present, it is ordinarily the case to increase the gas temperature at the inlet of the gas turbine to 1200° C. or slightly lower due to limitations by heat resistance and corrosion resistance performances of the materials for the gas turbine. Therefore, the generated gases are required to have a calorific value high enough to increase the gas temperature from 450° C. for the gas cleaning to 1200° C. at the inlet of the gas turbine. Although not shown in FIG. 11, a generated gas cooler is provided in a gas line between the gasification chamber 1 and the high-temperature dust collector 52 for cooling the gases to 450° C., for example, and a desulfurizer is also typically provided in the gas line. However, a gas line from the char combustion chamber does not need to have a gas cooler and a desulfurizer because limestone is charged into the furnace and circulated together with the fluidizing medium and the char combustion chamber 2 is in an oxidizing atmosphere where oxygen is present, so that the sulfur content is removed as $CaSO_4$.

Consequently, for the development of a power generation system using an improved pressurized fluidized-bed furnace, efforts should be made to obtain generated gases in as small an amount as possible and having as high a calorific value as possible. The reasons are as follows. If the amount of generated gases to be cleaned at 450° C. is reduced, the loss of sensible heat due to cooling is reduced, and a minimum required calorific value of the generated gases may be lowered. In the case that the calorific value of the generated gases is higher than the calorific value needed to increase the gas temperature to the required gas temperature at the inlet of the gas turbine, the ratio of combustion air can be increased to increase the amount of gases flowing into the gas turbine for a further increase in the efficiency of power generation.

In the system shown in FIG. 11, the combustion gases from the char combustion chamber 2 are dedusted in the high-temperature dust collector 51 which comprises a ceramic filter or the like, and then led to the gas turbine 55 for power recovery. While the combustion gases may be directly led to the gas turbine 55, the efficiency of power recovery may not always be high because the temperature of the combustion gases is not so high. Therefore, the combustion gases from the dust collector 51 are led to the topping combustor 53. The generated gases (combustible gases) from the gasification chamber 1 are dedusted in the high-temperature dust collector 52 which comprises a ceramic filter or the like, and then led to the topping combustor 53 where they are combusted. The combustion of the generated gases in the topping combustor 53 serves as stabilizing combustion for the combustion gases from the char combustion chamber 2. Because of the combustion heat generated in the topping combustor 53, the combustion gases from the char combustion chamber 2 (and the combustion gases used for stabilizing combustion) become high-temperature gases at about 1200° C. (possibly 1300° C., but depending on the heat-resistance of the gas turbine). The high-temperature gases are supplied to the gas turbine (power recovery device) 55. The combination of the char combustion chamber 2 and the topping combustor 53 corresponds to a combustor of an ordinary gas turbine unit.

The generator 57 connected to the rotating shaft of the gas turbine directly or through a speed reducer is driven to generate electric power. In the embodiment shown in FIG. 11, a compressor (typically an axial-flow air compressor) 56 is directly connected to the rotating shaft of the gas turbine 55 for producing compressed air. The compressed air from the compressor 56 is supplied to the char combustion chamber 2 as combustion air for the char combustion chamber 2. Part of the compressed air is supplied to the topping combustor 53. However, the topping combustor 53 can combust the generated gases with oxygen that remains in the exhaust gases from the char combustion chamber 2. In this embodiment, the interior of the pressure vessel 50 is pressurized to a pressure ranging from 5 to 10 kg/cm$^2$ (0.5 to 1.0 MPa). However, the interior of the pressure vessel 50 may be pressurized to about 30 kg/cm$^2$ (3.0 MPa) according to the specifications of the gas turbine 55.

In the embodiment shown in FIG. 11, since the combustion gases from the char combustion chamber 2 and the generated gases from the gasification chamber 1 are supplied to the gas turbine 55, the topping combustor 53 is needed as a premixing chamber for mixing these gases. In the case that only the generated gases from the gasification chamber 1 are led to the gas turbine 55, the generated gases may be introduced directly to a combustor 105 combined with a gas turbine unit 109 shown in FIG. 14 which will be described later. In the case that only the generated gases from the gasification chamber 1 are led to the gas turbine 55, the gas turbine 55 may be operated using highly calorific gases as a fuel.

The exhaust gases discharged from the gas turbine 55 are led via a line 125 to a waste-heat boiler 58, from which the exhaust gases flow through a line 128, a desulfurizer, and a denitrater (not shown), and then emitted from a stack (not shown).

The waste-heat boiler 58 recovers the heat of the exhaust gases and generates water steam. The generated water steam flows through a water steam pipe 127 to a steam turbine 112. A generator 113 connected to the rotating shaft of the steam turbine 112 directly or through a speed reducer is actuated to generate electric power. The water steam supplied to the steam turbine 112 may include water steam from the heat transfer pipes 41, 42.

Figure 12:
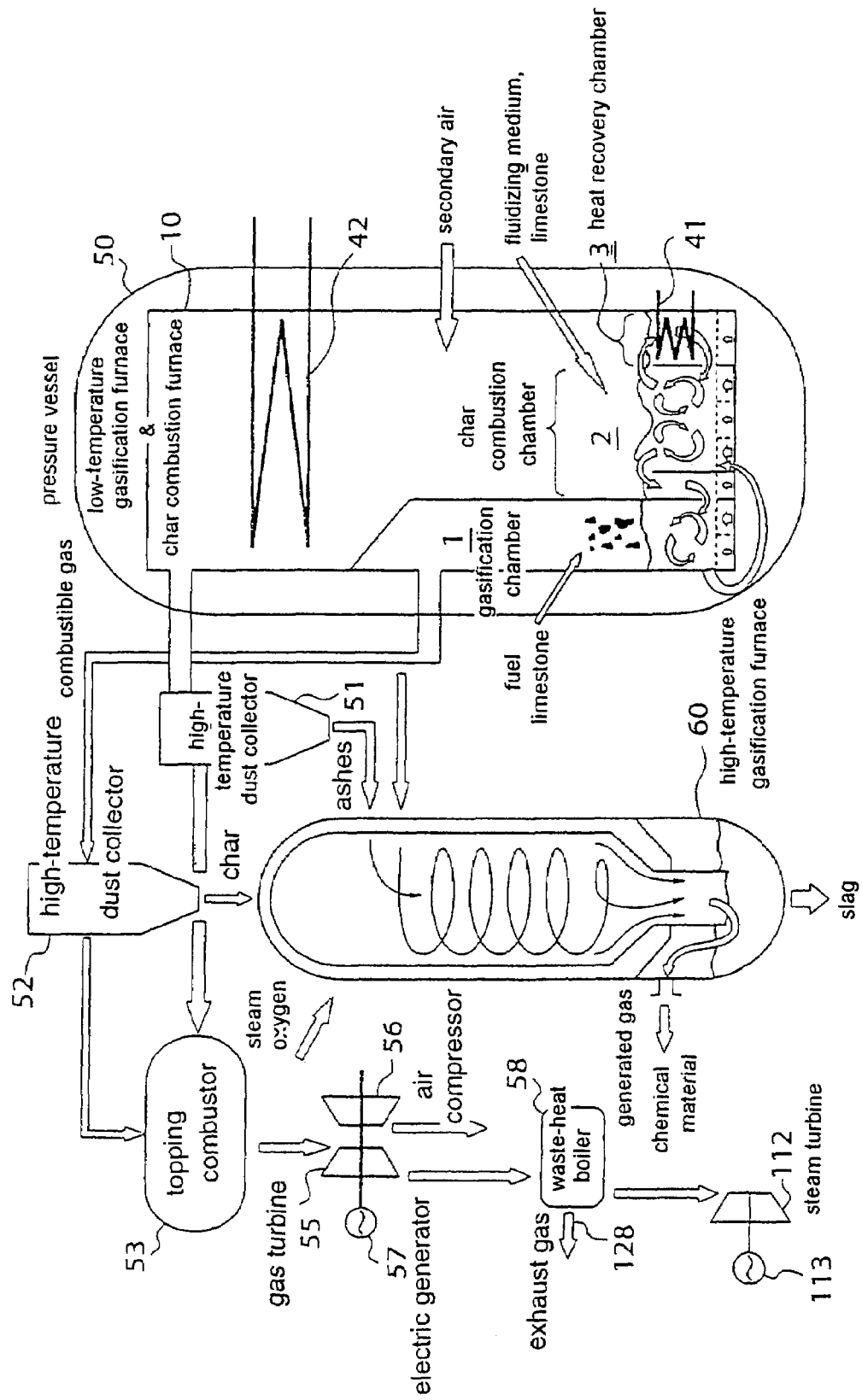
FIG. 12 is a schematic diagram showing a modification of the combined cycle power generation system shown in FIG. 11.

FIG. 12 shows another embodiment in which the integrated gasification furnace according to the present invention is employed in a combined cycle power generation system.

In the case that the fuel has a relatively high calorific value such as coal, it is possible to raise the temperature to a temperature sufficiently high to melt the ash without achieving complete combustion in the slagging combustion furnace. In this case, therefore, it is effective to replace the slagging combustion furnace 54 with a slagging gasification furnace 60 for producing gases. The slagging gasification furnace should preferably be a gasification furnace of the type which allows gases and slag to flow downwardly, heats the slag with the heat of the gases, and leads the gases into water to quench the gases while preventing the slag from failing flowability due to cooling. The produced gases thus obtained contain almost no chlorine, and can be used as a raw material for chemicals and also as a gas turbine fuel. In the embodiment shown in FIG. 12, as with the embodiment shown in FIG. 11, the gas turbine 55 is connected to the topping combustor 53, and the air compressor 56 and the waste-heat boiler 58 are provided. As with the embodiment shown in FIG. 11, furthermore, the steam turbine 112 and the generator 113 are used for power recovery.

Figure 13:
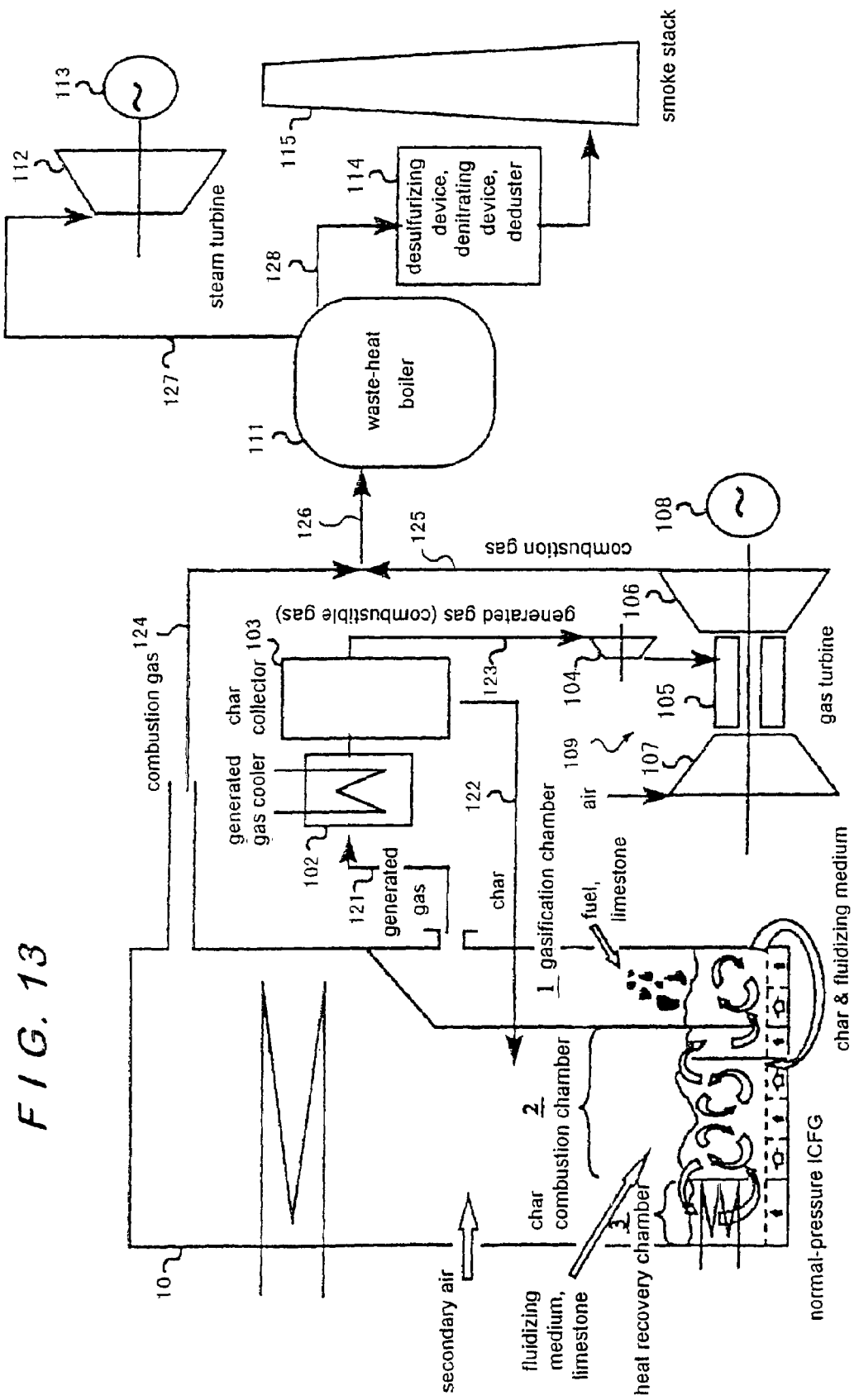
FIG. 13 is a schematic diagram showing a system for recovering power from generated gases from a normal-pressure-type integrated gasification furnace.

An embodiment in which the normal-pressure-type integrated gasification furnace (normal-pressure ICFG) according to the present invention is combined with a power recovery device will be described below with reference to FIG. 13. The system according to this embodiment is a so-called ICFG combined cycle power generation system. The gasification chamber 1 of the integrated gasification chamber 101 described with reference to FIG. 1, for example, is connected with a generated gas line 121 for delivering generated gases, a generated gas cooler 102 provided within the generated gas line 121, and a char collector 103, which are arranged in order. A conduit 122 is connected to a lower portion of the char collector 103 for returning collected char to the char combustion chamber 2. The char collector 103 is connected with a conduit 123 for leading generated gases which have been cleaned by separating char therefrom, to a combustion chamber 105 of a gas turbine unit. A generated gas compressor 104 is connected to the conduit 123 for increasing the pressure of gases generated in the gasification furnace at a normal pressure which is almost equal to an atmospheric pressure, to a pressure required for the gas turbine 106. The compressor 104 may be a reciprocating compressor or a centrifugal compressor depending on the flow rate and discharge pressure of the gases. Since the gases to be compressed are gases generated in the gasification furnace (i.e., a fuel which is in a relatively small quantity with a high calorific value) the power of the compressor 104 is not so increased.

In this embodiment, the gas turbine unit 109 which serves as a first energy recovery device uses only generated gases with a high calorific value from the gasification chamber 1, independently of the combustion gases from the char combustion chamber 2. That is, the generated gases are not mixed with the combustion gases from the char combustion chamber 2 and are not used to heat the combustion gases, but are led as a fuel to the first energy recovery device independently of the combustion gases.

An air compressor 107 is directly coupled to the rotating shaft of the gas turbine 106. Air supplied by the air compressor 107 and the generated gases compressed by the compressor 104 are combusted in the combustor 105, which produces combustion gases at a high temperature of about 1200° C. that are supplied to the gas turbine 106 to generate power. A rotating shaft of a generator 108 is connected to the rotating shaft of the gas turbine 106 directly or through a speed reducer for recovering the power as electric power. The combustion gases (exhaust gases) from the gas turbine 106 are discharged via a line 125.

On the other hand, The combustion gases (exhaust gases) from the char combustion chamber 2 and the heat recovery chamber 3 have sensible heat to be recovered, but do not have a calorific value as a fuel and a pressure to be recovered as power. The combustion gases are discharged via a line 124.

The line 124, 125 is joined into a line 126 connected to a waste-heat boiler 111. The waste-heat boiler 111 generates water steam with the heat of the waste gases, and the generated water steam is led via a water steam pipe 127 to a steam turbine 112. The rotating shaft of a generator 113 is connected to the rotating shaft of the steam turbine 112 directly or through a speed reducer for recovering the power as electric power.

The combustion gases (exhaust gases) at a lowered temperature, from which the heat is recovered by the waste-heat boiler 111, flow through a line 128 and are cleaned by at least one of a desulfurizer, a denitrater, and a deduster, and are then emitted from a stack 115.

Figure 15:
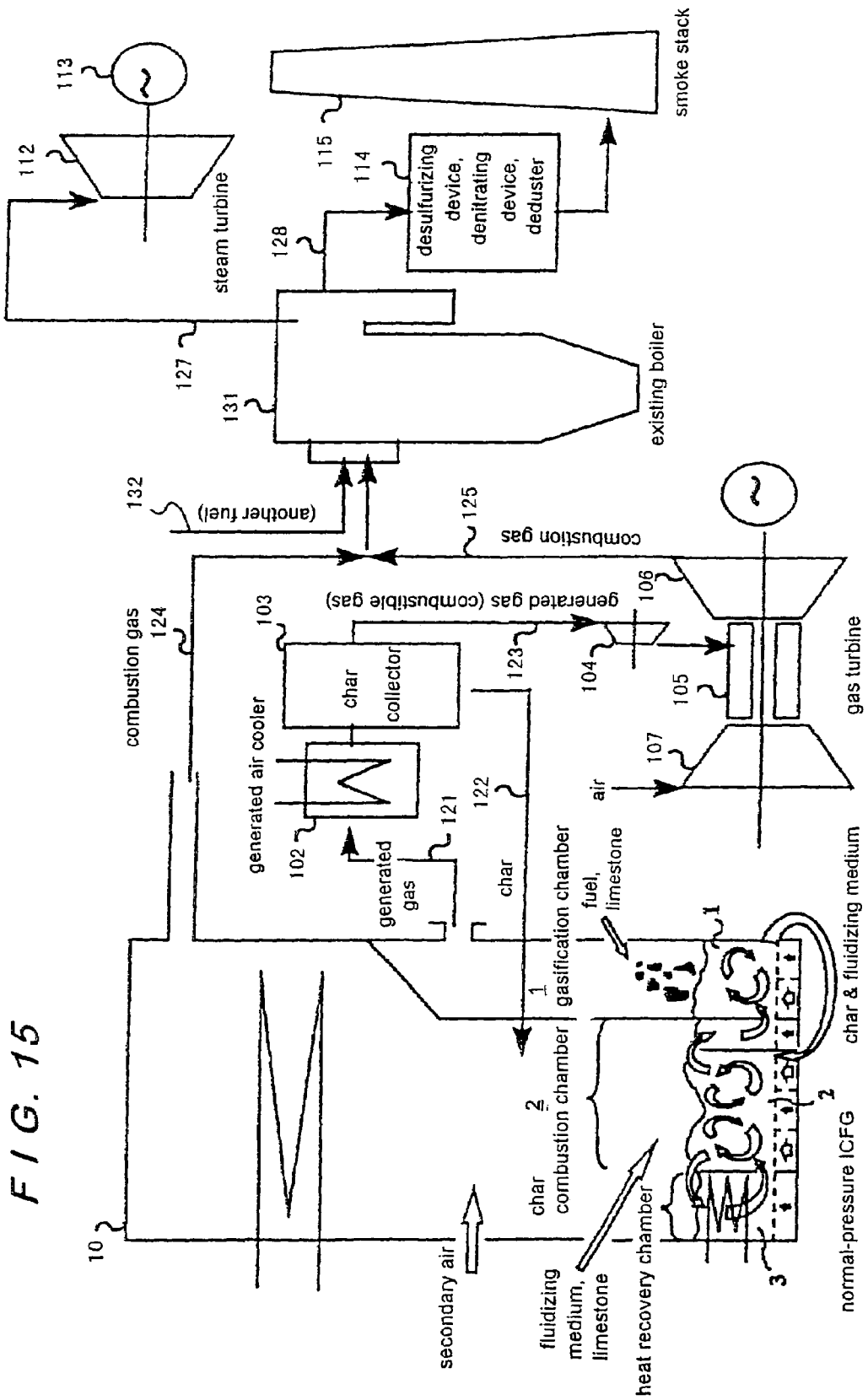
FIG. 15 is a schematic diagram showing a system which is a combination of the system for recovering power from generated gases from the normal-pressure-type integrated gasification furnace and an existing boiler.

As shown in FIG. 15, the integrated gasification furnace 10 or 101 may be connected to an existing boiler 131, rather than the new waste-gas (waste-heat) boiler 111. The difference between the amount of a fuel required by the existing boiler and the amount of generated gases and combustion gases supplied by the integrated gasification furnace 101 may be compensated for by supplying another fuel such as pulverized coal or the like via a fuel supply line 132. In this manner, it is possible to provide an apparatus for recovering power from generated gases and recovering remaining energy from exhaust gases inexpensively. With this arrangement, an existing boiler which discharges a $CO_2$ gas in a relatively large amount with respect to an energy such as generated electric power, can be converted into a highly efficient system. This is the repowering of the existing boiler.

In the above embodiment, the gas turbine 106 of the gas turbine unit is employed as a power recovery device which is an energy recovery device. However, a diesel engine which uses a gas fuel may be employed depending on the amount of generated gases as a fuel.

An embodiment in which the pressurized-type integrated gasification furnace according to the present invention is combined with a power recovery device will be described below with reference to FIG. 14. According to this embodiment, whereas the normal-pressure-type integrated gasification furnace shown in FIG. 13 operates substantially under the atmospheric pressure, the integrated gasification furnace 10 is disposed in the pressure vessel 50 and operates under a pressure higher than the atmospheric pressure. This is a feature that is identical to that of the integrated gasification furnace shown in FIG. 11. Since the gasification furnace 1 is under pressure, the gas compressor 104 is not required to supply the generated gases to the gas turbine unit 109, unlike the embodiment shown in FIG. 13. Therefore, the gas compressor 104 is not provided in the line 123. However, if the gas turbine comprises a standard-type gas turbine and its operating pressure is higher than the pressure of the pressurized-type integrated gasification furnace, then a gas compressor is employed to raise a pressure for making up for the pressure difference. The compression ratio of such a gas compressor may be lower than that in the case of FIG. 13.

Since the combustion gases from the char combustion chamber 2 have a pressure higher than the atmospheric pressure, the combustion gases are led via a line 124 to a dust collector 110 such as a ceramic filter or the like. After the combustion gases are cleaned by the dust collector 110, the compression gases are supplied to a power recovery turbine 141 as a second energy recovery device. The power recovery turbine 141 has a structure which is identical to that of the gas turbine of an ordinary gas turbine unit. An air compressor (typically an axial-flow air compressor) 142 is directly connected to the rotating shaft of the power recovery turbine 141. The compressed air from the compressor 142 is used as a fluidizing air in the char combustion chamber 2 and the heat recovery chamber 3. A generator 143 is connected to the rotating shaft of the power recovery turbine 141 directly or through a speed reducer for generating electric energy.

The exhaust gases, from which the pressure energy has been recovered by the power recovery turbine 141, are discharged via a line 131, combined with exhaust gases from the gas turbine 106 via the line 125, and are led to the waste-heat boiler 111. Other details of the embodiment shown in FIG. 14 are identical to the embodiment shown in FIG. 13, and will not be described below.

Figure 14:
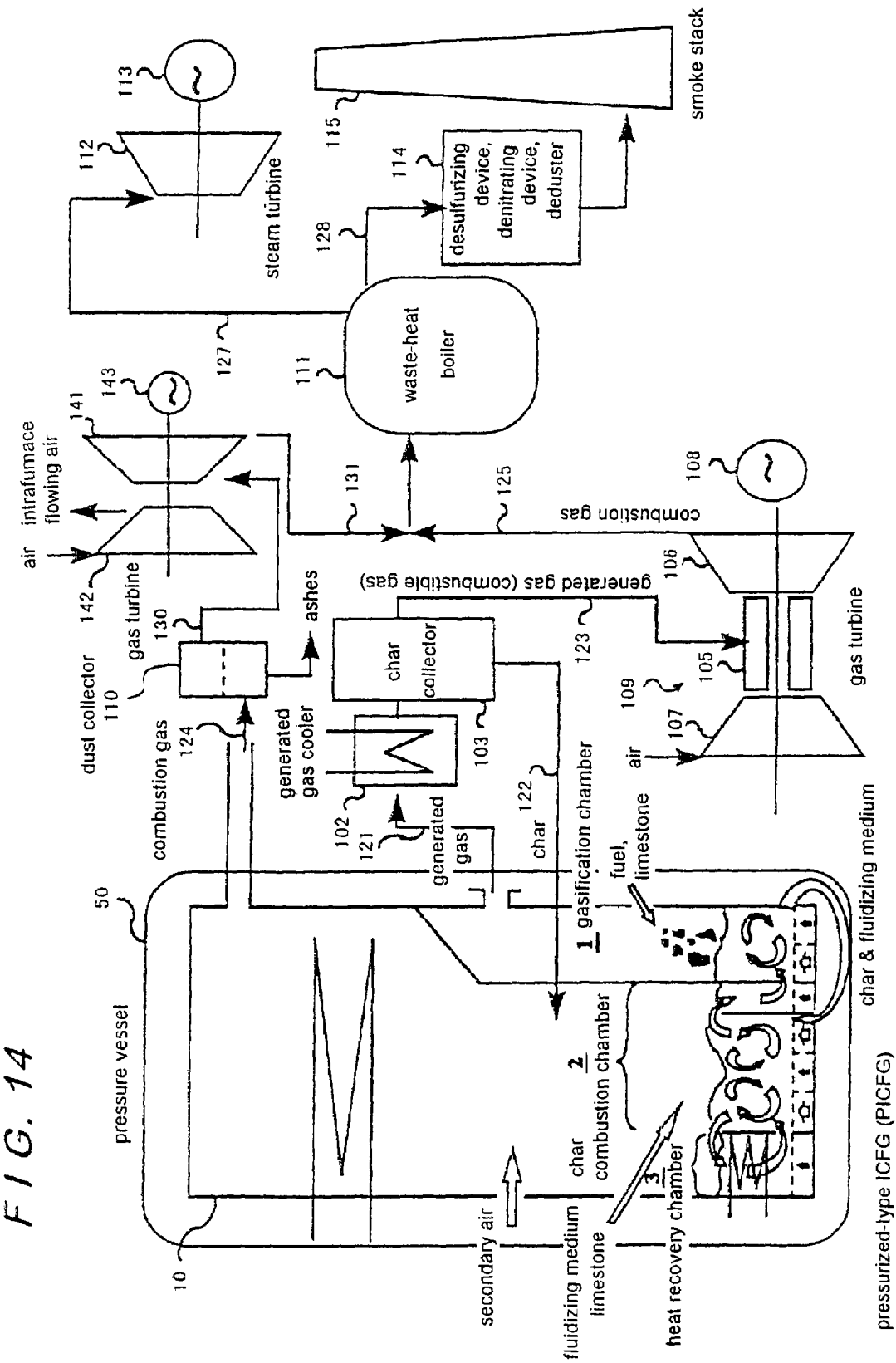
FIG. 14 is a schematic diagram showing a system for recovering power from generated gases from a pressurized-type integrated gasification furnace.
Figure 16:
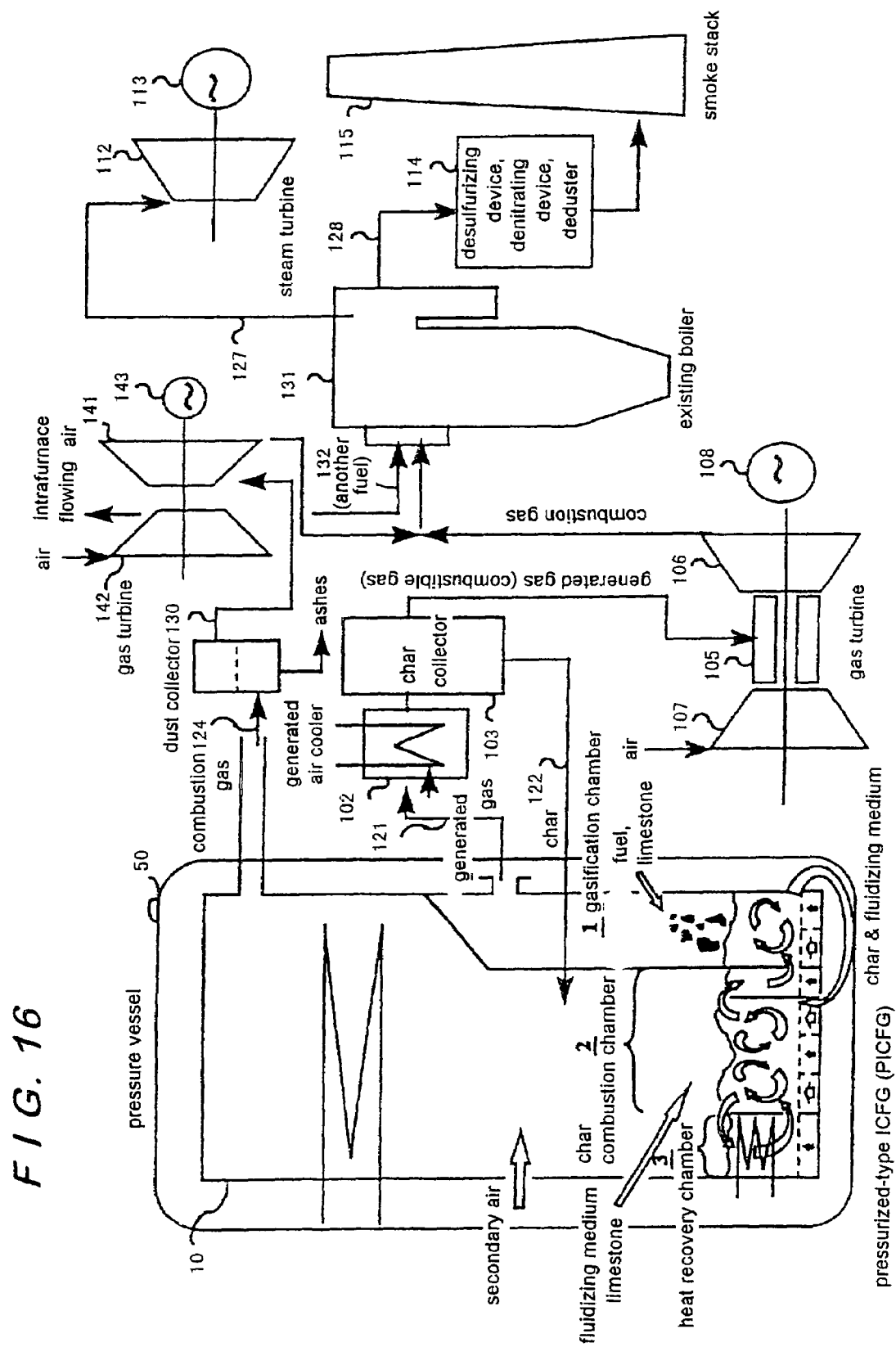
FIG. 16 is a schematic diagram showing a system which is a combination of the system for recovering power from generated gases from the pressurized-type integrated gasification furnace and an existing boiler.

As shown in FIG. 16, the waste-heat boiler 111 shown in FIG. 14 may comprise an existing boiler which uses pulverized coal as a fuel. The relationship between the embodiment shown in FIG. 16 and the embodiment shown in FIG. 14 is the same as the relationship between the embodiment shown in FIG. 15 and the embodiment shown in FIG. 13.

According to the present invention, as described above, since the fuel in the gasification chamber is gasified in the fluidized bed which is made of the high-temperature fluidizing medium that flows from the char combustion chamber, the gases discharged from the gasification chamber are mostly either gases only generated from the fuel or a mixture of gases generated from the fuel and fluidizing gases for the gasification chamber, and hence have a high calorific value. Since the char combustion gases and the generated gases are not mixed with each other, gases having a high calorific value can be obtained, and an energy such as power can be recovered from the generated gases by the energy recovery device.

It is possible to easily obtain high-temperature gases which are mixed with the char combustion gases and lead to the energy recovery device, typically the power recovery device such as a gas turbine, for increasing the energy recovery efficiency of power generation or the like. Even if the fuel is any of various fuels containing volatile components at largely different ratios, since the temperature of the char combustion chamber and the gasification chamber can easily be controlled, the fuel can be used without any equipment modification.

Even if a fuel such as municipal waste containing chlorine is used, most of the chlorine in the fuel is discharged into gases in the gasification chamber and does not remain in the char that flows into the char combustion chamber. Therefore, the chlorine concentration in the gases in the char combustion chamber and the heat recovery chamber is kept at an extremely low level. Even when the submerged pipes in the heat recovery chamber are used as superheater pipes to recover high-temperature steam, there is no risk of heat corrosion. Thus, the high-temperature steam recovery, together with the energy recovery with the power recovery device, makes it possible to recover energy with high efficiency.

Industrial Applicability

The present invention is profitable for a system which gasifies and combusts fuels including coal, municipal waste, etc., and recovers energy therefrom.

What is claimed is:
1. A gasification furnace comprising:
    a gasification chamber for pyrolyzing and gasifying a fuel to produce combustible gas and char;
    a char combustion chamber for combusting the char supplied from said gasification chamber;
    a partition wall for dividing said gasification chamber and said char combustion chamber, said partition wall having a supply opening located below an interface of a fluidized bed of said gasification furnace for allowing a fluidizing medium and the char to be supplied directly from said gasification chamber to said char combustion chamber;

a furnace bottom slanted downward toward said supply opening; and a settling char combustion chamber provided in said char combustion chamber for allowing the fluidizing medium to descend to a return opening located below the interface of the fluidized bed of said gasification furnace, the fluidizing medium being returned from said char combustion chamber to said gasification chamber through said return opening after the fluidizing medium descends in said settling char combustion chamber.

2. A gasification furnace according to claim 1, wherein said return opening and said supply opening are located below an upper surface of a dense bed of said gasification furnace.

3. A gasification furnace according to claim 1, wherein said return opening and said supply opening are located near said furnace bottom of said gasification furnace.

4. A gasification furnace according to claim 1, further comprising an incombustible material discharging port for discharging incombustible material from said gasification furnace.

5. A gasification furnace according to claim 1, wherein said partition wall comprises a first partition wall and a second partition wall having a lower end in contact with said furnace bottom of said gasification furnace and an upper end located at the interface of the fluidized bed.

6. A gasification furnace according to claim 1, wherein an internally revolving flow of the fluidized medium is formed in said gasification chamber.

7. A gasification furnace comprising:

a gasification chamber for pyrolyzing and gasifying a fuel to produce combustible gas and char;

a char combustion chamber for combusting the char supplied from said gasification chamber;

a settling gasification chamber provided in said gasification chamber for allowing a fluidizing medium and the char to descend to a supply opening located below an interface of a fluidized bed of said gasification furnace, the fluidizing medium and the char being supplied from said gasification chamber to said char combustion chamber through said supply opening after the fluidizing medium and the char descend in said settling gasification chamber, a furnace bottom slanted downward toward said supply opening; and a partition wall for dividing said char combustion chamber and said gasification chamber, said partition wall having a return opening located below the interface of the fluidized bed of said gasification furnace for allowing the fluidizing medium to be returned directly from said char combustion chamber to said gasification chamber.

8. A gasification furnace according to claim 7, wherein said return opening and said supply opening are located below an upper surface of a dense bed of said gasification furnace.

9. A gasification furnace according to claim 7, wherein said return opening and said supply opening are located near said furnace bottom of said gasification furnace.

10. A gasification furnace according to claim 7, further comprising an incombustible material discharging port for discharging incombustible material from said gasification furnace.

11. A gasification furnace according to claim 7, wherein an internally revolving flow of the fluidized medium is formed in said gasification chamber.

* * * * *